(12) United States Patent
Beshai et al.

(10) Patent No.: US 7,000,026 B2
(45) Date of Patent: Feb. 14, 2006

(54) MULTI-CHANNEL SHARING IN A HIGH-CAPACITY NETWORK

(75) Inventors: Maged E. Beshai, Stittsville (CA); Ernst A. Munter, Kanata (CA); Richard Vickers, Kanata (CA)

(73) Assignee: Nortel Networks Limited, (CA)

( * ) Notice: Subject to any disclaimer, the term of this patent is extended or adjusted under 35 U.S.C. 154(b) by 690 days.

(21) Appl. No.: 09/742,229

(22) Filed: Dec. 22, 2000

(65) Prior Publication Data

US 2002/0083195 A1    Jun. 27, 2002

(51) Int. Cl.
*G06F 15/173*    (2006.01)
*G06F 9/46*    (2006.01)

(52) U.S. Cl. ..................... 709/238; 718/105
(58) Field of Classification Search ............. 709/231, 709/238, 227, 232, 226; 370/395.43, 43, 370/542; 395/391, 466, 473, 465, 4; 725/105; 718/105

See application file for complete search history.

(56) References Cited

U.S. PATENT DOCUMENTS

| | | | | |
|---|---|---|---|---|
| 4,383,316 A | * | 5/1983 | Seidel | 370/536 |
| 4,577,312 A | * | 3/1986 | Nash | 370/249 |
| 5,058,133 A | * | 10/1991 | Ducanson et al. | |
| 5,459,720 A | * | 10/1995 | Iliev et al. | 370/393 |
| 5,841,771 A | * | 11/1998 | Irwin et al. | |
| 5,987,508 A | * | 11/1999 | Agraharam et al. | |
| 6,081,523 A | * | 6/2000 | Merchant et al. | 370/389 |
| 6,088,736 A | * | 7/2000 | Manning et al. | |
| 6,215,798 B1 | * | 4/2001 | Carneheim et al. | |
| 6,366,614 B1 | * | 4/2002 | Pian et al. | |
| 6,493,666 B1 | * | 12/2002 | Wiese, Jr. | 704/230 |

(Continued)

*Primary Examiner*—William C. Vaughn, Jr.
*Assistant Examiner*—J. Bret Dennison
(74) *Attorney, Agent, or Firm*—Steubing McGuinness & Manaras LLP

(57) ABSTRACT

Methods and apparatus for transferring data segments of a data stream across multi-channel links in a high-capacity network, so that the segments are equitably smeared across the channels of each multi-channel link, are described. The high-capacity network comprises a multiplicity of distributed high-capacity edge nodes interconnected by multi-channel links to a plurality of core nodes. Each edge node comprises a source node and a sink node which may share memory and control. A path from a source node of a first edge node to a sink node of a second edge node traverses two links, a first link from the source node to a selected core node and a second link from the selected core node to the destination sink node. Tandem switching through an intermediate edge node is not required, even for data streams of very low bit rate.

Two types of core nodes are described. A core node of a first type is constructed as a high-capacity single-plane switch. A core node of a second type is constructed as a very-high capacity multiple-plane switch. Accordingly, traffic-load balancing across each multi-channel link in the network is realized by a data smearing process that is tailored to the core node type. A first-order data smearing method that balances the traffic loads among the channels of a first multi-channel link in a two-link path is used in conjunction with said first-type core nodes. A second-order data smearing method that balances the traffic load of each data stream across the channels of both links in a two-link path is used in conjunction with said second-type core nodes.

Both first-order and second-order smearing methods are exercised at each source node, and the core nodes, regardless of their type, perform rudimentary tasks and are deliberately kept devoid of quality-control capability.

2 Claims, 20 Drawing Sheets

U.S. PATENT DOCUMENTS

| | | |
|---|---|---|
| 6,542,268 B1 * | 4/2003 | Rotolo et al. |
| 6,542,964 B1 * | 4/2003 | Scharber ................... 711/122 |
| 6,577,653 B1 * | 6/2003 | Rochberger et al. |
| 6,629,147 B1 * | 9/2003 | Grow ......................... 709/236 |
| 6,697,365 B1 * | 2/2004 | Messenger |
| 6,711,125 B1 * | 3/2004 | Walrand et al. ............. 370/223 |
| 6,718,393 B1 * | 4/2004 | Aditya |
| 6,778,548 B1 * | 8/2004 | Burton et al. |
| 6,788,692 B1 * | 9/2004 | Boudreau et al. ........... 370/400 |
| 2003/0067653 A1 * | 4/2003 | Aicklen et al. ............. 359/139 |
| 2003/0144018 A1 * | 7/2003 | Minnick et al. |
| 2003/0185205 A1 * | 10/2003 | Beshai ....................... 370/370 |

* cited by examiner

|  | Port 7 | Port 8 |
|---|---|---|
| Link-A | 16 | 16 |
| Link-B | 22 | 10 |
| Link-C | 14 | 18 |
| Link-D | 12 | 20 |
|  | 64 | 64 |

|  | Port 7 | Port 8 |
|---|---|---|
| Plane-0 | 27 | 13 |
| Plane-1 | 14 | 12 |
| Plane-2 | 12 | 16 |
| Plane-3 | 11 | 23 |
|  | 64 | 64 |

MULTI-CHANNEL SHARING IN A HIGH-CAPACITY NETWORK

STATEMENT REGARDING FEDERALLY SPONSORED RESEARCH

This work was supported by the United States Government under Technology Investment Agreement TIA F30602-98-2-0194. The Government has certain rights in this invention.

FIELD OF THE INVENTION

This invention relates generally to the field of data networks. In particular, it relates to a network architecture and a data-transfer method that enable the construction of wide-coverage high-capacity networks that permit the transfer of contiguous data streams of very-high bit rates while avoiding tandem switching even for a data stream of very low bit rate.

BACKGROUND OF THE INVENTION

The rapid growth of data traffic, and the potential for innovative applications requiring capacities that are orders of magnitude higher than current capacity requirements, motivate a radical new thinking of network structures. An edge-controlled network provides the simplicity and scalability required to construct and control vast versatile networks. Several architectural alternatives can be devised to construct an edge-controlled high-capacity network.

The growth and distribution of data traffic is difficult to quantify and forecast. In addition, the changing nature of traffic and the difficulty of its characterization render network modeling for traffic-engineering purposes impractical. It is, therefore, necessary to rethink the network-design methodology and look for approaches that can lead to networks that reduce or eliminate the need for traffic engineering.

Prior art solutions that aim at circumventing the difficulty of traffic characterization and estimation include agile optical-core networks that scale to several petabits per second (Pb/s). U.S. patent application Ser. No. 09/286,431, filed on Apr. 6$^{th}$, 1999 and titled SELF-CONFIGURING DISTRIBUTED SWITCH describes a network architecture in which a plurality of high-capacity fast-switching electronic edge nodes are interconnected by an agile wavelength-space-switching optical core. The core node controllers select paths through associated core nodes and reconfigure the paths in response to dynamic changes in traffic loads. The core is reconfigured in response to reconfiguration requests sent from the edge nodes. The reconfiguration requests are based on data traffic volumes, and the steps of reconfiguration include traffic monitoring at ingress edge nodes, communication of traffic-intensity data to core nodes, modifying connections within the core node, and coordinating the channel-switching functions in the edge and core nodes.

In the adaptive channel-switching-core network, each edge node has allocated channels to selected other edge nodes. The number of allocated channels may be modified at reconfiguration time. An edge node accepts new connections based on its current capacity allocation to other edge nodes. The edge-node's controller also monitors its packet queues to other edge nodes and determines whether a change in capacity allocation is warranted. The need for changing capacity allocation is determined at the edge node. The node controller may then request an increment or a decrement in inter-edge-node channel allocation based on occupancy fluctuation.

Each edge node determines its capacity requirements to different sink nodes and communicates them to selected core-node controllers. A selected core-node controller attempts to satisfy the requirements based on free-capacity availability and, possibly, other criteria such as traffic classification. It then returns the scheduling decisions to the edge nodes. At reconfiguration, three functions are implemented: releases (return of resources), capacity-increase requests, and new requests (increase from zero). It is desirable that the traffic load be distributed in a way that equalizes the occupancies of the core nodes.

With adaptive channel switching, traffic streams of low intensity are aggregated in a conventional manner and intermediate switching is performed. A traffic stream with an intensity of less than 0.20 of a channel capacity, for example, can be switched at an intermediate point. The load threshold beyond which a direct-channel is allocated is a design parameter.

Thus, the aforementioned prior-art solutions to network scalability and efficiency confine a connection to a single channel (a single wavelength in a WDM link) and, due to the switching coarse granularity, as an entire channel is switched, a proportion of traffic is transferred from a source node to a sink node through an intermediate edge node. The frequency of reconfiguration is constrained by the propagation delay between the edge nodes and the channel-switching core nodes. A large interval between successive reconfigurations results in coarse granularity. For example, at 10 Gb/s, a reconfiguration interval of 100 milliseconds results in a granularity of 1 gigabit, which is quite high, thus forcing tandem switching for low bit-rate data streams.

In order to further simplify network design and operation, it is desirable to entirely eliminate the need for tandem switching, This simplifies the data scheduling process while maintaining high network efficiency and enables the transfer of data streams of widely-varying capacity requirements.

Fine granularity can be realized by conventional packet switching in the core where some, or all, of the core nodes can be constructed as packet switches thus avoiding the reconfiguration process and the need for time coordination associated with an agile channel-switching core. However, there are several drawbacks in using a packet-switching core:

(1) In order to realize a high-capacity network, a core node must have a large number of ports, 1024 for example, each operating at a high speed, of 10 Gb/s for example. Thus, the packet scheduling process could become unwieldy, (2) Core switching becomes protocol dependent while, with channel switching, only the source nodes and sink nodes need be protocol aware, (3) For data streams of high bit rate, for example of several Gb/s, the overhead associated with individual packet routing may be viewed as wasteful considering that the data of the stream is confined to the same physical path anyway and all that is needed is to chain data blocks of the high bit-rate stream with a minimal overhead, and, (4) extensive buffering may be needed at the core because a core node receives packets from uncoordinated edge nodes.

Thus, the use of a packet-switching core is not a viable option for a high-capacity high-performance data network.

Circuit-switching has inherent coarse granularity, forcing tandem switching for data streams of low bit rates. With high capacity edge nodes and core nodes, packet switching can eliminate the need for tandem switching, but it has drawbacks as mentioned above. Both adaptive circuit switching and conventional packet switching limit the bit-rate of a data stream below a channel capacity.

In anticipation of applications that would require transferring data streams of very high bit rates, techniques that enable sharing high-capacity links are required. Fiber links, each carrying a large number of wavelengths, are now realizable. Each wavelength can be modulated to carry data at a rate exceeding 10 Gb/s, forming a single channel, and a fiber link may support a multiplicity of channels that can carry data at rates exceeding one terabits per second. This provides a tremendous opportunity for configuring networks that effectively and economically exploit this capability.

In the light of the limitations of the prior art, there is a need for means of pooling channels to increase link utilization and network efficiency, and there is also a need for establishing direct connections, avoiding tandem switching at intermediate edge nodes, in order to simplify network design and control.

SUMMARY OF THE INVENTION

It is therefore an object of the invention to develop an architecture of a wide-coverage data network that scales to a total external capacity of several petabits per second (Pb/s) while strictly limiting each connection between any two edge nodes to the use of a single hop, a hop being defined as a connection through a single core node.

It is another object of the invention to enable the transfer of a contiguous data stream of a bit rate that substantially exceeds the capacity provided by a single channel in a multi-channel link from any edge node to any other edge node.

It is a further object of the invention to develop an architecture of a wide-coverage high-capacity data network that enables efficient transfer of heterogeneous traffic combining fine-grained and coarse-grained traffic streams.

It is yet another object of the invention to develop an architecture of a wide-coverage high-capacity data network in which control is predominantly applied at the edge and real-time coordination between the edge and core is eliminated.

In accordance with one aspect of the present invention, there is provided a method of transferring a data stream across a multi-channel link, the data stream comprising a train of data segments, wherein data segments of said data stream are carried on any of the channels of said multi-channel link thus enabling traffic streams to share the entire capacity of a multi-channel link. The method further includes transferring any segment of said data stream on any channel of a multi-channel link.

In accordance with another aspect of the present invention, there is provided, in a network comprising a plurality of source nodes and a plurality of sink nodes, the source nodes being connected to the sink nodes by a plurality of core nodes, each of the source nodes having a multiplicity of multi-channel links to said sink nodes, a method of first-order smearing for transferring data from source nodes to sink nodes across multi-channel links.

In accordance with another aspect of the present invention, there is provided, in a network comprising a plurality of source nodes and a plurality of sink nodes, the source nodes being connected to the sink nodes by a plurality of core nodes, each of the source nodes having a multiplicity of multi-channel links to said multiplicity of core nodes, each of the core nodes having a multiplicity of multi-channel links to said sink nodes, a method of second-order smearing for transferring data from source nodes to sink nodes across multi-channel links.

In accordance with another aspect of the present invention, there is provided a high capacity network comprising a plurality of source nodes each of said source nodes receiving data at a plurality of ingress ports, a plurality of sink nodes each of said sink nodes delivering data to a plurality of egress ports, a plurality of core nodes each of said core nodes connecting said source nodes to said sink nodes, and a data scheduler to regulate the rate of transfer of data traffic from each of said source nodes to each of said sink nodes, each of said source nodes being connected to a subset of said core nodes by diverging multi-channel links and each of said core nodes being connected to a subset of said sink nodes by converging multi-channel links, and said data scheduler selects a one of said diverging multi-channel links to carry data from a one of said source nodes to a one of said sink nodes wherein said scheduler distributes the data load equitably among the channels of each of said diverging multi-channel links and each of said converging multi-channel links.

In another aspect, in order to match core connectivity to projected traffic patterns, a plurality of cross connectors, each connecting a subset of source nodes to a subset of core nodes and a connecting subset of said core nodes to a subset of said sink nodes, each of said cross connectors connecting to at least one of the core nodes by at least one multi-channel link, each core node connects to at least one cross connector by at least one multi-channel link, and each cross connector connecting to at least one sink node by at least one multi-channel link.

In accordance with a further aspect of the present invention, an apparatus is provided for load balancing among channels of a multi-channel link by grouping the packets received from an incoming data channel, each packet having a destination identifier for each of M possible destinations, M>1, into Q groups, Q>1. The apparatus includes means of data sorting according to data stream identification, means of allocating each stream to a multi-channel link leading to a core node, and means of selecting a channel in the selected multi-channel link so that the traffic load of the data streams is substantially equalized across the channels of the multi-channel link.

Thus, the present invention develops techniques that enable the treatment of a band of channels (wavelengths), forming a link or a virtual link, as a single shared-resource supporting a mixture of low bit rate and high bit rate traffic streams, eliminating the need for tandem switching at intermediate edge nodes, and realizing both high-performance and high network efficiency. The steps that lead to high-performance and high efficiency are:

(1) Data stream accommodation based on service rate control;
(2) Data stream routing based on vacancy of an entire link or a virtual link; and
(3) Data segment allocation to a channel in a link or a virtual link based on a principle of zero-mean deviation of traffic intensity among the channels of a shared link or a shared virtual link.

The advantages provided by the present invention include ease of accommodating data stream of widely-varying granularity and high network efficiency due to multiple-channel sharing,

BRIEF DESCRIPTION OF THE DRAWINGS

In the figures which illustrate example embodiments of this invention:

FIG. 11-b summarizes the load per link in the example of FIG. 11-a;

FIG. 11-c summarizes the load per switching plane in the example of FIG. 11-a;

It will be noted that, throughout the appended drawings, like features are identified by like reference numerals.

DETAILED DESCRIPTION OF THE PREFERRED EMBODIMENT

Figure 1:
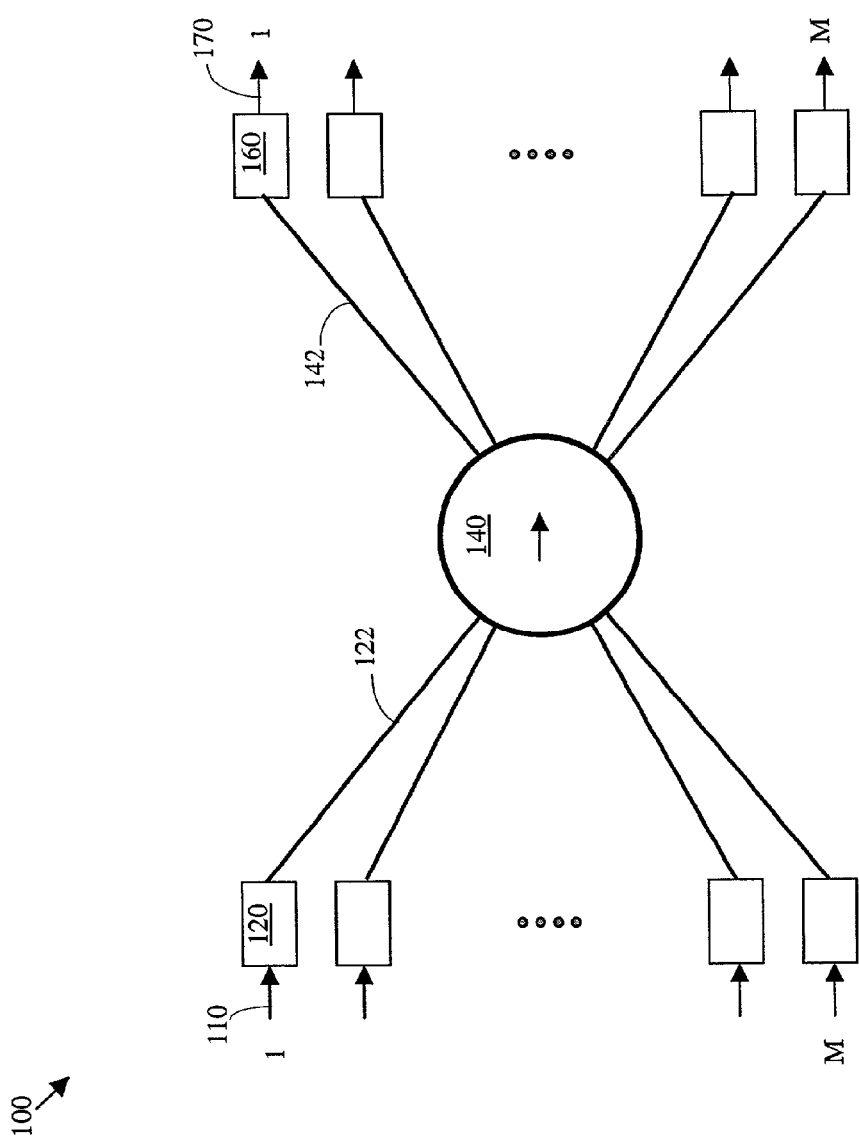
FIG. 1 is a schematic of a generic architecture of a high-capacity high-performance network having a single high-capacity core node.

This invention relates to a data network having edge nodes interconnected by core nodes, each edge node comprising a source node and a sink node. Multi-channel links, such as WDM fiber links, connect the edge nodes to the core nodes either directly or through cross connectors. In order to maximize the utilization of the multi-channel links, and to enable the transfer of high rate data, a data stream may be transferred in several channels within a multi-channel link. Each multi-channel link, or a channel subset thereof, may then be treated as a single shared medium regardless of the number of channels it supports. The data transfer from the geographically distributed edge nodes need not be coordinated. However, some form of quality control, whether user driven or network driven, can be used to avoid persistent overload in the core nodes. The available free capacity in a route from a source node to a sink node is determined by the available free capacity in each of two concatenated multi-channel links comprising the route. Several mechanisms can be devised to enable the use of a multi-channel link as a single medium. One such mechanism is based on a data "smearing" approach, in accordance with the present invention, which results in traffic-load equalization over all the channels of each link.

Data Format

Typical data sources generate packets of variable sizes and can be routed as such through a data network. However, it is known in the art that the use of fixed-size packets significantly facilitates network scalability. Methods of packet segmentation into fixed-size segments at source nodes and packet assembly at sink nodes are known in the art. One of the drawbacks of such methods is that they can result in capacity waste due to null-padding of incomplete segments. A method of efficient packet segmentation which reduces capacity waste is described in U.S. patent application filed on Dec. 14, 2000 and titled "Compact Segmentation of variable-size-packets streams", which has common inventors with the present application, the contents of which are incorporated herein by reference. The method segments a data stream comprising variable-size packets, a data stream being defined by its source node, sink node, assigned network route, and other attributes. The segments are of equal size and the method concatenates the packets in successive segments in a manner that attempts to minimize segmentation waste without undue delay. The method facilitates the construction of efficient networks that scale to very high capacities while respecting service-quality specifications. Apparatus for implementing the method are also described in the aforementioned application.

Link Subsets

Cross connectors may be used to enable flexible capacity assignment. Cross connectors enable channel grouping into virtual links each of which may have a channel content that differs from the channel content of other virtual links. For example, while each of a fiber link at the input of a cross connector may carry 40 wavelengths (40 channels), a fiber link at the output of the cross connector may include a single virtual link carrying 40 channels selected from several input fiber links, or two virtual links each carrying 20 channels selected from the channels of any subset of the input fibers. Various combinations of virtual links having complementary channels can be formed. For example, if each of J>1 input fiber links has 40 channels, then J virtual links having 16 channels each and J virtual links having 24 channels each can be formed at the output of the cross connector. Thus, a link emanating from a cross connector may contain one virtual link or a plurality of virtual links. The controls that effect the formation of virtual links must communicate with source nodes so that each source node becomes aware of the channels constituting a virtual link in order to enable data forwarding.

Hereinafter, a multi-channel link, such as a WDM fiber link, emanating from a cross connector will be synonymously called a link or a virtual link.

Network Architecture

FIG. 1 is a schematic of a generic network having a plurality of source nodes 120, a plurality of sink nodes 160, and a single very-high capacity core node 140. Each source node receives data from subtending data sources through incoming channels, individually or collectively referenced as 110. Each source node is connected to the core nodes by a high-capacity link that can carry a traffic load equal to the entire capacity of a source node. Each sink node delivers data to subtending data sinks through outgoing channels, individually or collectively referenced as 170. Each sink node is connected to the core nodes by high-capacity links that can carry a traffic load equal to the entire capacity of a sink node.

This generic network is clearly impractical if the network is to cover a wide territory. In order to realize a high-capacity network 100, the core node 140 must be capable of supporting a large number of edge nodes. A practical upper bound of the number of edge nodes is about one thousand, with each node having a capacity of about 4 Terabits per second (Tbis). By dividing the central core node into several core nodes, as will be described below with reference to FIG. 2, an efficient wide-coverage network can be realized. An edge node is preferably a universal switch as described in U.S. patent application, Ser. No. 09/244,824, filed on Feb. 4, 1999 and titled "Rate-Controlled Multi-class High-capacity Packet Switch", which has inventors common to those of the present invention and the contents of which are incorporated herein by reference.

Figure 2:
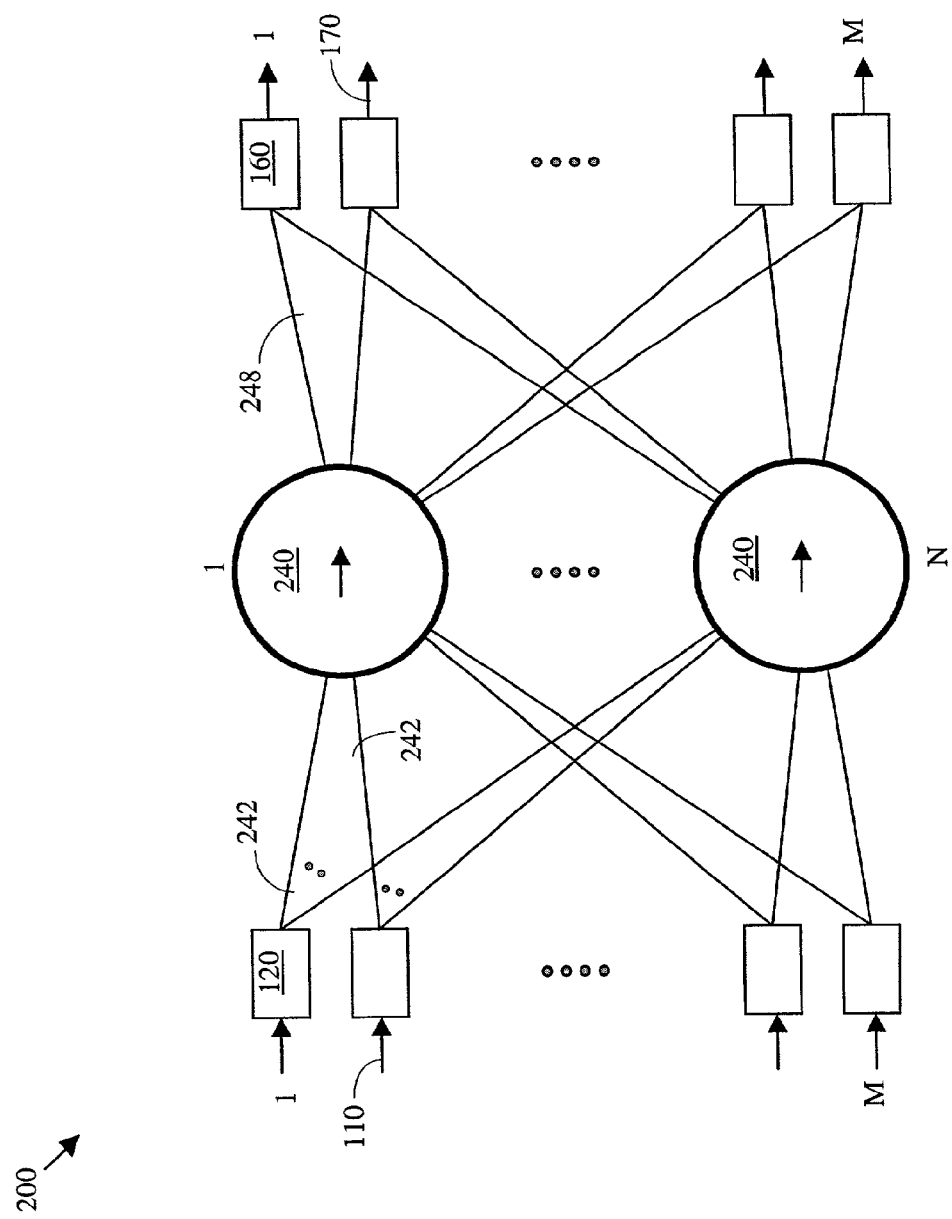
FIG. 2 is a schematic of a network derived from the generic network of FIG. 1 where the core node is split into several independent core nodes and each of the distributed core nodes is connected by multi-channel links to source nodes and sink nodes.

FIG. 2 is a schematic of a symmetrical network 200 having M source nodes 120, M sink nodes 160, and N core nodes 240. Each source node 120 preferably has a large number of ingress ports (320 for example) receiving data traffic from incoming channels 110, and a comparable number of output ports connecting to the network core nodes 240 by multi-channel links 242. The output ports of a source node are divided into N groups, each group comprising W ports. The electrical signals of the W output ports of each group modulate optical carriers of different wavelengths, and the resulting optical signals are multiplexed onto a W-channel optical fiber link 242. The N optical fiber links 242 are directed to at least one core node 240. Each sink node 160 receives data traffic from core nodes 240 through multi-channel links 248. Each sink node 160 assembles variable-size packets from the data segments it receives and delivers said variable-size packets to subtending sinks (not shown) through channels 170.

For brevity, the set of core nodes is collectively referenced as the core and the set of edge node, each edge node comprising a source node and a sink node, is collectively referenced as the edge.

In order to support a traffic stream of high rate, exceeding the capacity of a single channel, it is preferable to connect each edge node 120/160 to each of selected core nodes 240 by a multi-channel link 242/248. Otherwise, said traffic stream of high rate may be transferred through parallel paths using different links or virtual links and potentially having significant propagation delay differences, thus requiring an elaborate delay compensation process -to enable assembling the data stream at the sink node.

Figure 3:
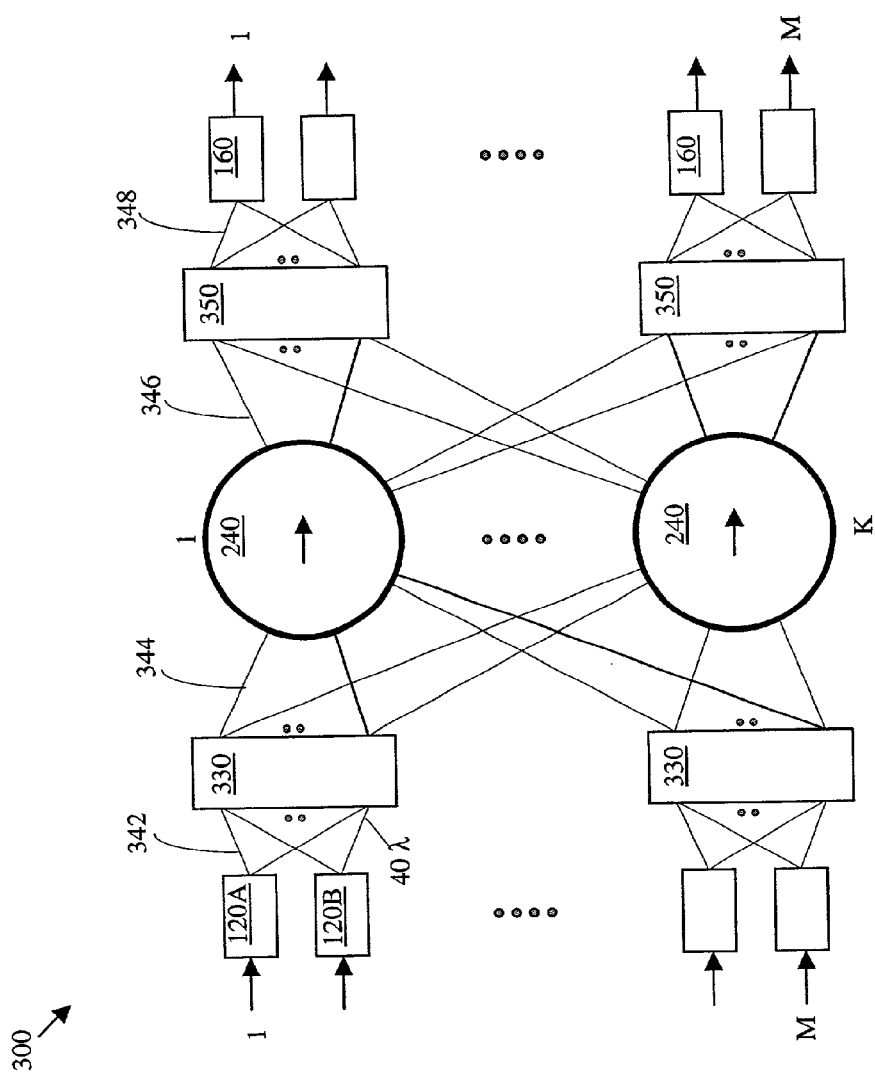
FIG. 3 shows a network adapted from the network of FIG. 2 by introducing cross connectors between the edge and the core.

FIG. 3 shows a network 300 adapted from network 200 by introducing cross connectors 330/350 between the edge and the core. In the configuration of FIG. 2, each source node connects to the core by multi-channel links 242; typically multi-channel links 242 are WDM (wave-division multiplexed) fiber links. The maximum number of core nodes 240 that can be reached by a source node equals the number of multi-channel links emanating from the source node and assigned to the core. For example, a source node 120 having 320 output ports may use eight fiber links to transfer its traffic to the core with each fiber link supporting a set of 40 wavelengths (a set of 40 channels) and a maximum of eight core nodes 240 may be used. In order to increase the number of core nodes to 16, for example, while still enabling each source node to reach each core node to form a flexible network, cross connectors 330 may be introduced to divide the set of 40 channels of each fiber link 342 into two subsets of 20 channels each of which can be routed differently. Thus, a fiber link 344 emanating from a cross connector 330 may carry a subset of 20 channels from a source node 120A and a subset of 20 channels from a source node 120B. The method of load balancing, in accordance with the present invention, may then be applied to each channel subset, instead of the entire channel set that define a link as will be described in detail below. As mentioned earlier a channel subset is also called a virtual link. Similarly, cross connectors 350 are introduced to enable each sink node to receive traffic from 16 core nodes in the above example. The set of 40 channels of a fiber link 346 connecting a core node 240 to a cross connector 350 may comprise two virtual links of 20 channels and the two virtual links may be routed differently. Thus, a link 348 connecting a cross connector 350 to a sink node may contain channels in virtual links from different core nodes 240. By comparison, a link 248 in FIG. 2 contains channels from only one core node 240 to a sink node 160.

The cross connectors 330/350 also enable the provision of different transport capacities from a source node 120 to the core and/or from the core to a sink node 160 in order to match traffic patterns. The division of a channel set into two or more virtual links can also be adapted to the traffic loads.

Each of the cross connectors 330 or 350 preferably comprises parallel optical switches. The number of ports per optical switch is determined by the number of edge nodes sharing a cross connector 330 or 350. The larger the number of edge nodes sharing a cross connector 330/350, the more the opportunity to form virtual links of arbitrary sizes (number of channels), and the higher the configuration flexibility.

Figure 4:
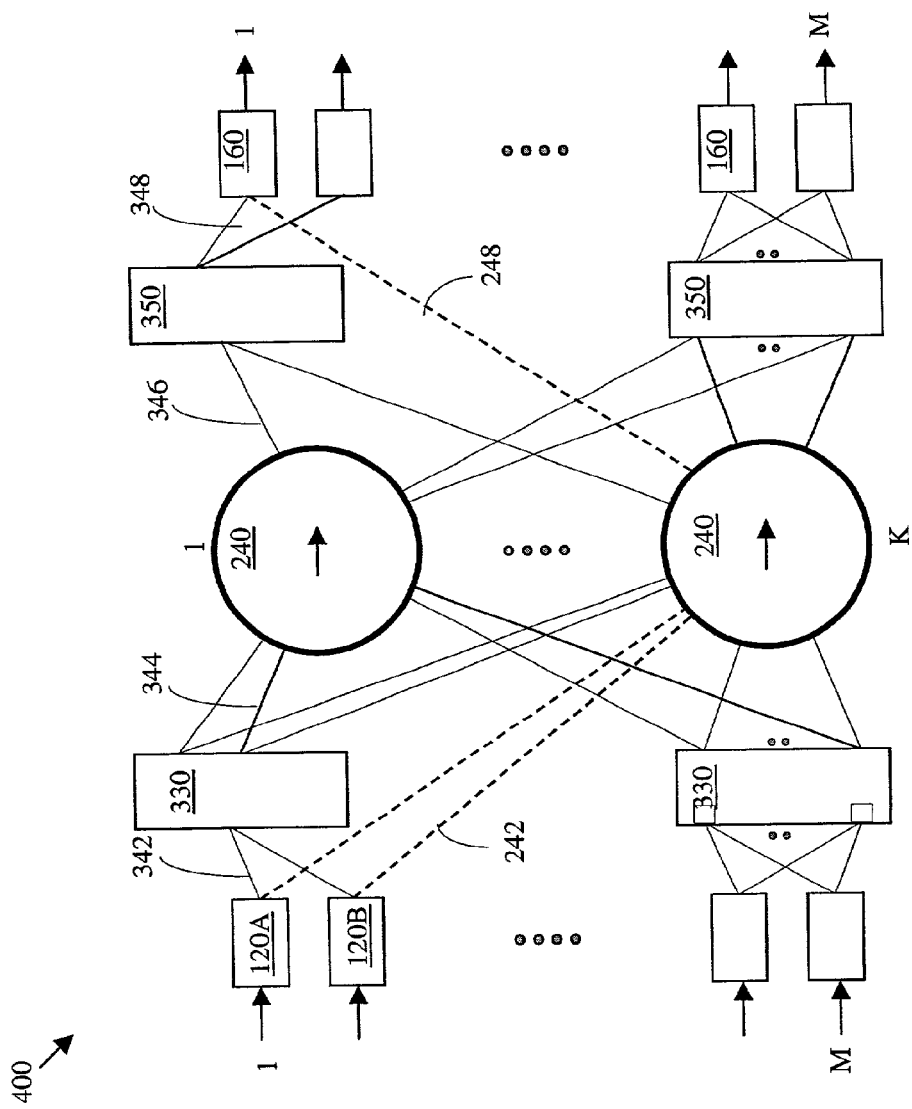
FIG. 4 shows a network adapted from the network of FIG. 2 by partially introducing cross connectors between the edge and the core.

FIG. 4 shows a network 400 that uses cross connectors 330/350 to form virtual links 344/346, as in network 300 of FIG. 3, in addition to using links 242/248 of fixed channels, as in network 200 of FIG. 2, to connect the edge and the core.

Figure 5:
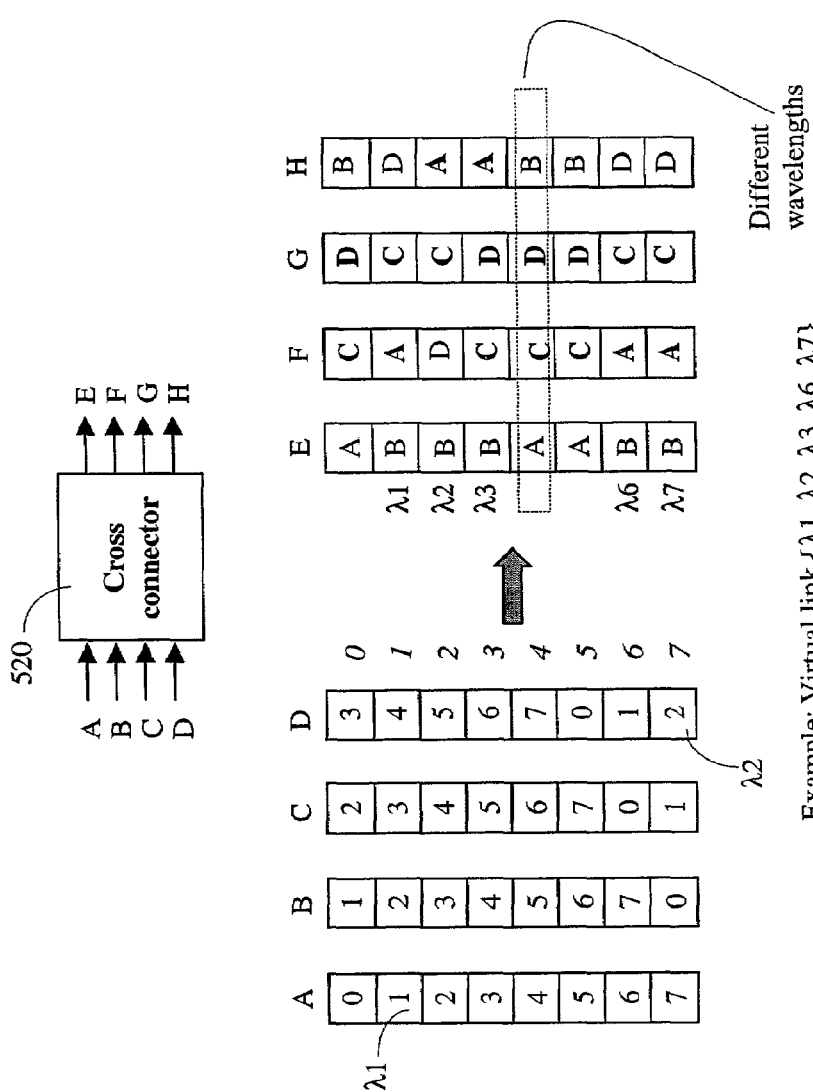
FIG. 5 illustrates the use of cross connectors to form virtual links.

FIG. 5 illustrates a cross connector 520 connecting four incoming links of 8 channels each, labeled A to D, and four outgoing links, of 8 channels each, labeled E to H. In this example, each of the links is a WDM fiber link supporting 8 wavelengths labeled 0 to 7. The content of the incoming links are illustrated by the column arrays shown. The channels of the incoming links are shown in a shifted pattern so that the channels in any row correspond to four different wavelengths and, hence, can share a fiber link. For example, the channels in the bottom row are labeled 7, 0, 1, and 2 corresponding to likewise numbered wavelengths. The channels routed to the outgoing links are indicated in the right side. Outgoing link E carries wavelengths 0, 4, and 5 from incoming link A and wavelengths 1, 2, 3, 6, and 7 from incoming link B, and the wavelength set $\{\lambda 1, \lambda 2, \lambda 3, \lambda 6, \lambda 7\}$ form a virtual link. Outgoing link F carries channels 0, 3, 4, and 5 from incoming link C, channels 1, 6, and 7 from incoming channel A, and a single wavelength, 2, from incoming channel D, and so on. Channels from an incoming link that have a common destination sink node form a virtual link and the channels of a virtual link may be shared by a traffic stream identified by the source node from which the virtual link originates.

In the description that follows, a data stream is defined by its source node and its sink node, unless otherwise indicated. Furthermore, the distinction between links and virtual links, insofar as the load-balancing methods according to the present invention are concerned, is unnecessary and the term virtual link will be used hereinafter to refer to either a link or a virtual link, unless otherwise indicated.

The bit rate of a data stream may vary with time and, in some applications, the variation may be significant. A communication network that enforces service quality normally requires a quantitative description of a traffic stream requesting access. Several techniques have been developed over the past decade to determine such a quantitative measure, and the quantitative measure is called "effective bit rate", "equivalent bit rate", or, generally, "representative bit rate". The determination of the representative bit rate is irrelevant to the task of sharing a multi-channel link and is mentioned only to indicate its effect on network efficiency.

Source Node

Figure 6:
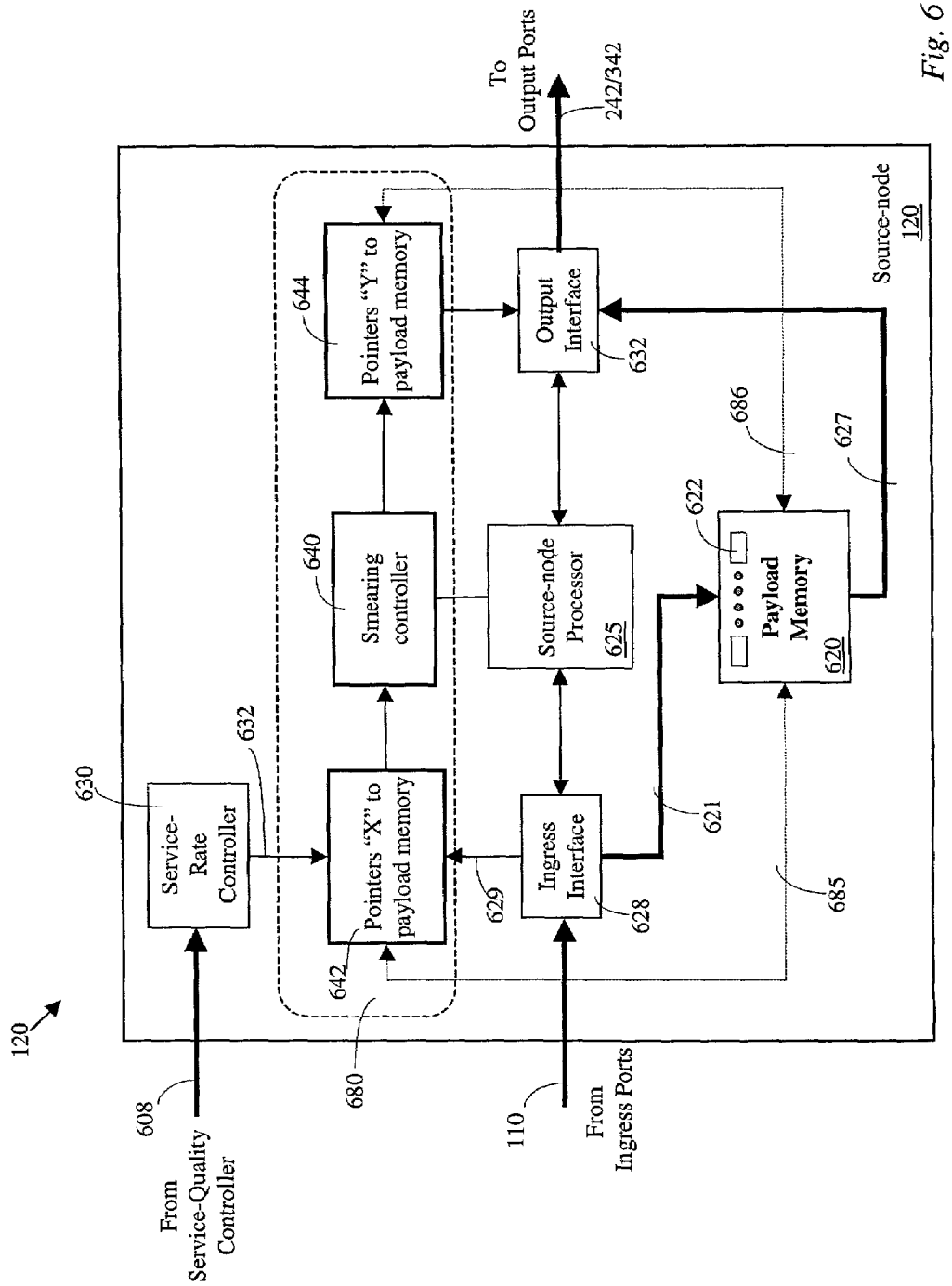
FIG. 6 shows the control elements of a source node.

FIG. 6 is a schematic of a source node 120 that is adapted to perform the smearing function in accordance with the present invention. As described earlier, each source node 120 is paired with a sink node 160 with which it may share control and memory. The source node receives data from data sources (not illustrated) through incoming channels collectively referenced as 110 as indicated in FIGS. 1, 2, 3, 4, and 6. The source node 120 transfers data to core nodes 240 through multi-channel links 242 (FIG. 2), 342 (FIG. 3), or both 242 and 342 (FIG. 4).

The sink node 160 required to implement the smearing method of the present invention is a conventional prior art sink node and is not, therefore, illustrated herein. The source node 120 shown schematically in FIG. 6, however, has new components 680 that are necessary for the execution of the methods of the present invention.

Data segments are received from incoming channels referenced collectively as incoming channels 110 and transferred to the network core through outgoing channels referenced collectively as outgoing links 242/342.

Each of the incoming channels 110 is connected to an ingress port and each of the channels of outgoing links 242/342 is connected to an output port of the source node 120. An ingress interface 628 acquires the signals carried by the incoming channels 110 and identifies individual data segments. Each of said data segments has a header that identifies a destination of the segment. Each data segment received from one of the incoming channels 110 is stored in a payload memory 620. The payload memory 620 may be a common memory shared by all incoming channels 110 or it may comprise an array of memories each of which being dedicated to a subset of incoming channels 110, and said subset may contain only a single channel. The organization of payload memory 620 is irrelevant to the features that are essential to the task of payload equalization according to the embodiments of the present invention.

An index of a data segment points to the location (address) of the actual data segment in payload data memory 620. In a well-controlled network, in particular, with a properly functioning service-quality controller, the size of payload memory 620 can be relatively small, with an estimated maximum occupancy of less than 1000 segments. However, to virtually eliminate the incidence of data segment loss, a storage capacity that is an order of magnitude higher than the estimated requirement is preferred in a network that promotes service quality. A storage capacity of $2^{16}$ (65536) segments would be adequate and an index of a data segment would be 2-octets long (16 bits). If payload memory 620 is organized in an array of memories each of which buffers the segments of one or more incoming channels 110, then the index of a data segment must have two parts: an individual memory selector and an address within the individual memory.

When the header of an incoming data segment is read and a destination is identified, the segment is stored in payload memory 620 at a memory address 622 (FIG. 6). An index of said memory address 622 is then directed by the ingress interface 628 to an index-memory X, 642, which stores the index of each segment placed in payload memory 620. The data segment indices queued in index-memory "X", 642, are sorted in a manner that facilitates selective treatment of the data segments as will be described in detail below.

An essential component of source node 120 that is adapted to function in accordance with the present invention is a service rate controller 630 which operates under instructions from a service-quality controller (not illustrated). A service-quality controller performs a function of admission control of new data streams or admission of requests of capacity-allocation enhancements from an already active data streams. A service-quality-controller also performs other functions, such as service-type negotiations with traffic sources, which are irrelevant to the load-balancing function of source node 120. The service-rate controller prompts the index-memory "X", 642, to transfer a segment of a specific data stream out of the source module. The service-rate controller performs this function to ensure that service-quality agreements associated with each data stream are respected. The data-segment indices in index-memory "X", 642, are sorted according to destination sink nodes, and possibly other attributes, in order to enable fast dequeueing of each index of a segment selected by the service-rate controller 630, as will be described with reference to FIG. 17.

A smearing controller 640 transfers an index of a data segment from index-memory "X", 642, to another index-memory "Y", 644. Smearing controller 640 receives an index of a data segment (the index length is of the order of only 2 bytes as described earlier) from index-memory "X", 642, and holds it in a register (not illustrated). A conventional processing circuit (not illustrated) in smearing controller 640 then consults a memory holding load balancing tables (to be described with reference to FIGS. 18 and 19) and transfers said index of a data segment to index-memory "Y", 644 in a location that is indicative of an outgoing channel from the source node 120 to a network core module 240.

In overview, the new component provided in the source node 120, in accordance with the present invention, comprises the index-memory pair 642 and 644 which operate under control of a smearing controller 640 and a prior-art service-rate controller 630.

Connectivity Options

Figure 7:
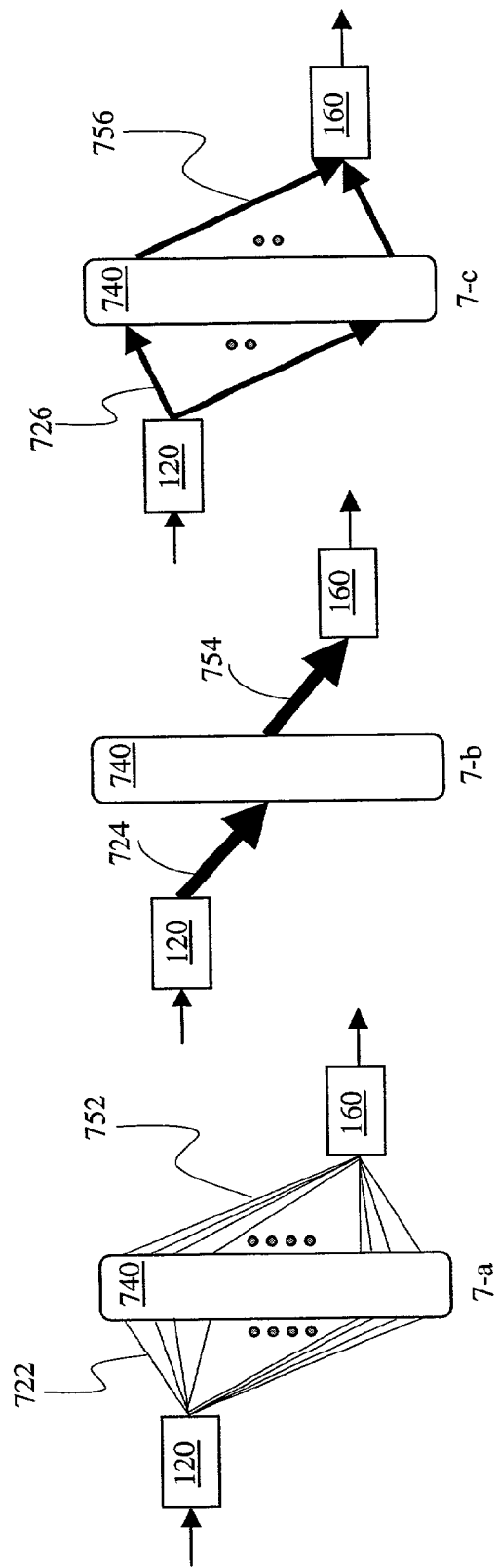
FIG. 7 shows connectivity options in the networks of FIG. 2 and FIG. 3.

FIG. 7 illustrates options of connectivity of a source node and a sink node to the network core. As mentioned earlier, the term 'network core' refers collectivity to a plurality of core nodes. The source node 120 shown is connected by P channels 722, herein called diverging channels, to the core and the sink node 160 shown receives data from Q channels 752, herein called converging channels, through the network core 740. The network core 740 may represent a single core node 140 as in network 100 shown in FIG. 1 and FIG. 7-*b* or a set of core nodes 240 as in networks 200, 300, or 400, shown in FIGS. 2, 3, 4, and in FIGS. 7-*a* and 7-*c*. P and Q are not necessarily equal. In FIG. 7-*a*, the P channels 722 and the Q channels 752 are shown individually. In FIG. 7-*b*, the P channels 722 are grouped in one link 724 and the Q channels 752 are grouped in one link 754. In FIG. 7-*c*, the P channels are divided into a plurality of diverging multi-channel links 726 and the Q channels are divided into a plurality of converging multi-channel links 756. In the representations of FIGS. 7-*a*, 7-*b*, and 7-*c*, the same number of channels connects the edge to the core.

The purpose of the different representations in FIG. 7 is to highlight major routing differences. In FIG. 7-*a*, a data stream is confined to a path from a source node to a sink node that is one channel wide. In FIG. 7-*b* a data stream from a source node to a sink node uses a path that is P channels wide, or Q channels wide if Q is less than P. In FIG. 7-*c*, a data stream is confined to a path the width of which is the lesser of the number of channels in the two links constituting the path from source node 120 to sink node 160. With P=Q=320, for example, and using 8 multi-channel links from a source node 120 to the core and 8 multi-channel links from the core to an sink node 160, a path from a source node 120 to a sink node 160 would be 40-channels wide. The ratio of the capacity of a path to a representative bit-rate of a data stream requesting allocation to the path has a major implication on the network efficiency in general and on the computational effort needed to accommodate a new data stream. If the ratio is less than one, then the data stream cannot be accommodated in a single path. If the ratio is greater than one but less than an order of magnitude, 8 for example, then careful path allocation management techniques must be used to enable proper packing of the capacity of the provided path to realize a reasonable link utilization. If the ratio is more than two orders of magnitude, 100 for example, then the allocation of a data stream to a path is carefree, in the sense that link packing techniques are not required, and the network becomes naturally efficient.

While network efficiency is a major consideration, the practicality of routing . implementation is another major consideration. If a data stream is confined to a single channel, as explained above with reference to FIG. 7-*a*, the core may comprise a large number of parallel M×M space switches. The resulting routing effort at the source node can be considerably high because each allocation of a data stream to a channel requires examining a large number of channels. As explained above, a single-channel path is only suitable for a data stream having a relatively small representative bit rate. If, on the other hand, the entire capacity from an edge node to a core node is to be freely shared, the core 740 must be implemented as a single ultra-high capacity node which is not only impractical but also resulting in an unreliable network because a failure in the single-node core can disrupt the entire network. A good compromise is the configuration of FIG. 7-*c* where a plurality of links, or virtual links, connects the edge to the core with each link or virtual link having a moderate number of channels. High efficiency can be realized by using each multi-channel link as a shared resource. The routing effort at a source node is now reduced in comparison with the case of single-channel sharing because a source node need only examine the vacancies in eight links, in the example cited above, instead of examining the vacancies in 320 channels as in the case of FIG. 7-*a*. In addition, the probability of finding a path with sufficient vacancy is significantly increased, thus reducing the incidence of rejecting new data streams and, therefore, increasing the overall network throughput.

Figure 8:
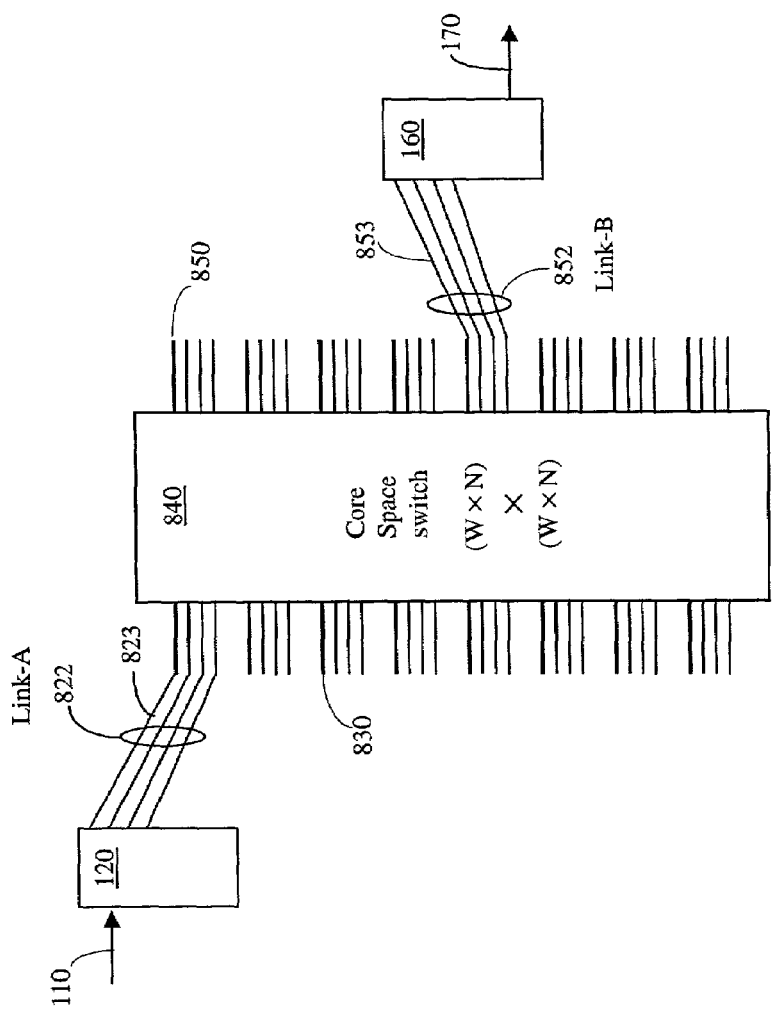
FIG. 8 illustrates edge node connection to a core node constructed as a single-plane switch.

FIG. 8 shows a core node 240 constructed as a single plane switch 840. Several such core nodes 840 constitute the network core 740. Multi-channel link 822 can be a link 242 (FIG. 2) or a link 344 (FIG. 3). Multi-channel link 852 can be a link 248 (FIG. 2) or a link 346 (FIG. 3). A multi-channel links 822 carries data from a source node 120 to core node 840 and a multi-channel link 852 carries data from a core node 840 to a sink node 160. The data of any channel 823 in a multi-channel link 822 can be switched to any channel 853 in a multi-channel link 852. Thus, the individual channels 823/853 in a link 822 or link 852 need not be equally loaded. However, load equalization within each multi-channel link 822 or 852 is desirable because it permits a source node to use each multi-channel link as a single shared resource.

In the multi-channel sharing method described above, a data stream may be forwarded to all the channels of a multi-channel link regardless of the bit rate of the data stream. A data stream can use any of the channels of a multi-channel link along its path to a sink node. The capacity requirement for a data stream can then be computed on the basis of the entire capacity of the multi-channel link. In a restrictive data forwarding method where a data stream is confined to the use of a single channel from a source node to a core node, and a single channel from a core node to a sink node, the computation of the capacity requirement for a data stream must be based on the capacity of the single channel. It is well known in the art that pooling resources results in higher resource utilization and lower service delay. Multi-channel sharing in accordance with the methods of the present invention can significantly enhance network efficiency.

Realizing a network with a large number of edge nodes each connected to core nodes by multi-channel links requires core nodes of very-high capacity. For example, if the number of edge nodes is 1000, and the number of channels per multi-channel link is 40, the required number of ports per core node would be a prohibitive 40000 ports. A practical solution is to use 40 parallel switches, each of which having 1000 dual ports (input/output ports), as will be explained with reference to FIG. 9. The single-plane core node 840 is suitable, however, for a network of moderate capacity, having 20 edge nodes for example, with a total capacity of less than 100 Terabits per second.

Figure 9:
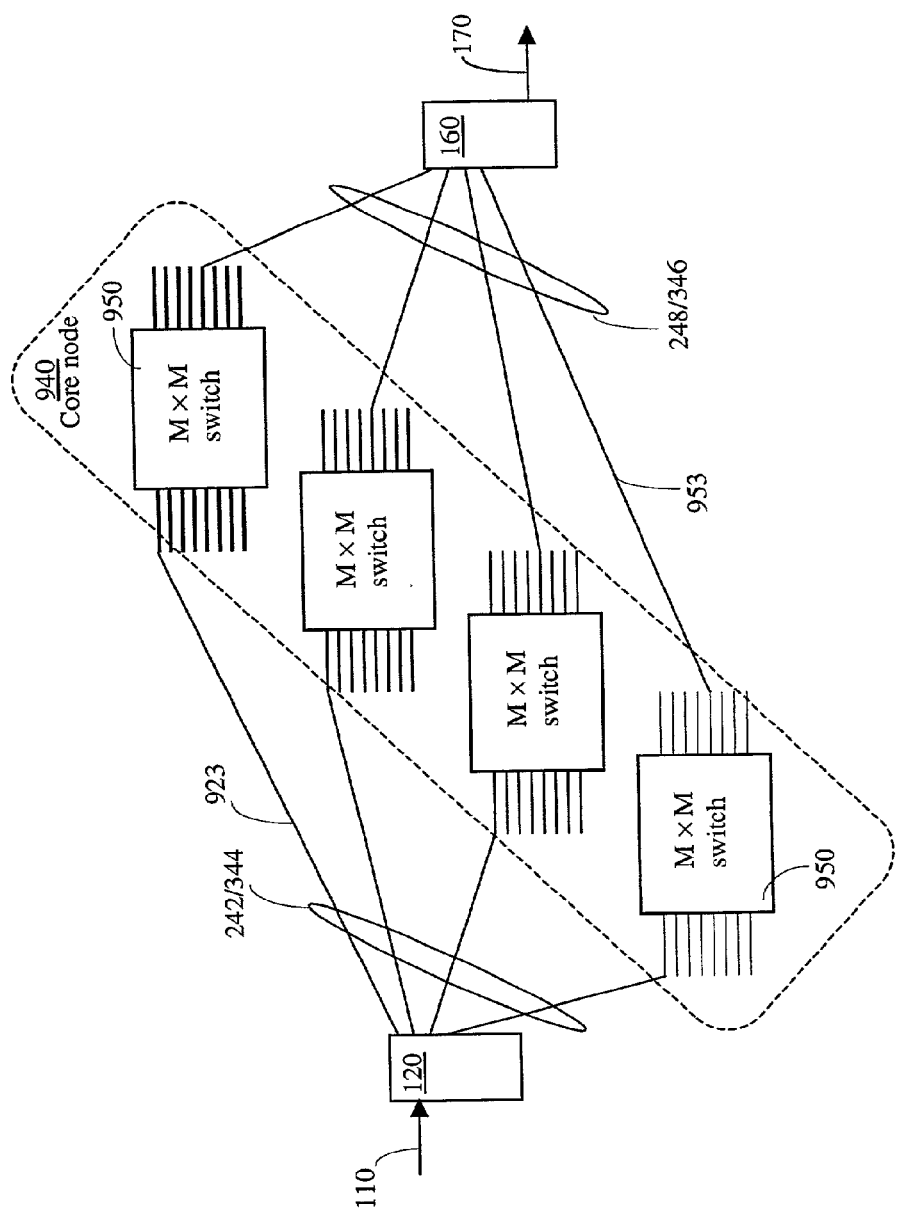
FIG. 9 illustrates edge node connection to a core node constructed as a multi-plane switch.

FIG. 9 shows a core node 240 constructed as a parallel-plane node 940. Each core node 940 comprises a multiplicity of switch planes 950 each plane being an M×M switch. Multi-channel link 242/344 can be a link 242 (FIG. 2) or a link 344 (FIG. 3). Multi-channel link 2481346 can be a link 248 (FIG. 2) or a 346 (FIG. 3). Multi-channel links 242/344, only one is illustrated, carry data from each source node to core node 940 and multi-channel links 248/346, only one is illustrated, carry data from each core node 940 to sink nodes 160. The data of a channel 923 in a multi-channel link 242/344 can only be switched to a channel 953 in a multi-channel link 248/346 if the two channels are connected to the same switching plane 950. Due to spatial mismatch of channel vacancy, it may not be possible to accommodate a new data stream in a path that traverses links 242/344 and 248/346, even when each of links 242/344 and 248/346 has a sufficient free capacity to support the data stream. One way to reduce or eliminate the mismatch, without recourse to complicated scheduling, is to require that the traffic load of each data stream traversing any multi-channel link be equally divided among respective individual channels of the multi-channel links. This results in balancing the load among the output ports that support each outgoing multi-channel link 248/346.

It is noted that both a single-plane core node 840 and a multiple-plane core node 950 are suitable for constructing networks 200, 300, or 400. A major difference between a single-plane core node 840 and a multiple-plane core node 940 is that a single-plane core node 840 can support multi-channel links of different sizes while a multi-plane core node 940 supports multi-channel links of the same size. The size of a multi-channel link is defined herein as the number of channels in the link.

Figure 10:
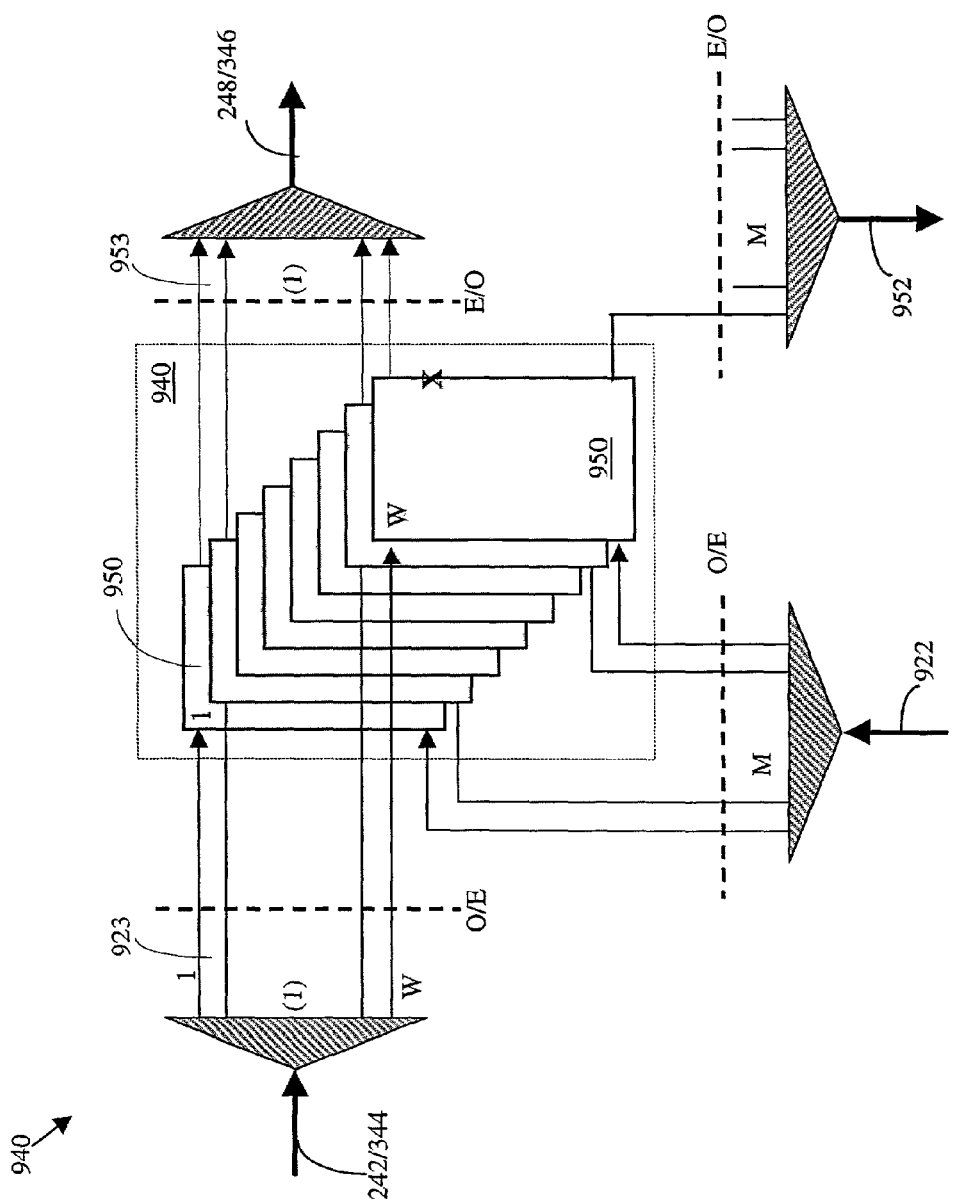
FIG. 10 shows the multi-plane structure of a core node switching packets among corresponding channels of incoming and outgoing multi-channel links.

FIG. 10 is a schematic of a multi-plane core node supporting M incoming multi-channel links and M outgoing multi-channel links. Each of the multi-channel links is a fiber link supporting W wavelengths, each wavelength corresponding to a channel. Each of the switching planes 950 is a space switch having data buffering means at the input. With electronic buffering, optical-electrical conversions, and vice versa, would be required as indicated by the O/E and E/O interfaces in FIG. 10. An outgoing W-channel link, supporting a channel from each plane carries data from any incoming W-channel link to a sink node 160. To illustrate the potential overload problem in a multiple-plane core node 940, consider a case where, in one of the switching planes 950 (FIG. 9 and FIG. 10), traffic from all input ports of the plane to an output port identified by "X" may exceed the capacity of the output channel emanating from output port "X", while other channels in the same output W-channel link to which the channel belongs may be under-loaded.

Overload can be avoided by scheduling the usage of each channel, as described in U.S. patent application, Ser. No. 09/475,139, filed on Dec. 30, 1999 and titled "Agile Optical-Core Distributed Packet Switch", which has inventors common to those of the present invention. Overload can also be avoided by balancing the traffic of each stream individually within each multi-channel path, in accordance with the present invention. As described earlier, the solution based on confining a data stream to a single channel is limited to networks of intermediate capacity, of the order of 100 Tera bits per second for example, due to the need for extensive computation. In addition, confining a data stream to a single link results in less efficient link utilization and difficulty of routing a data stream having a high bit rate exceeding the capacity of a single channel.

The input multi-channel links 242/344 to a core node 940 are numbered sequentially, for example from 1 to M in a network of M source nodes. Similarly, the output multi-channel links 248/346 from a core node 940 to sink nodes are numbered sequentially, for example from 1 to M in a network of M sink nodes. Each input multi-channel link connects to W input ports of core node 940, one port in each switching plane 950. Similarly, each output multi-channel link 248/346 connects to W output ports of core node 940, one output port from each switching plane 950. An input port or an output port assumes the sequential number of the multi-channel link to which it belongs.

Figure 11A:
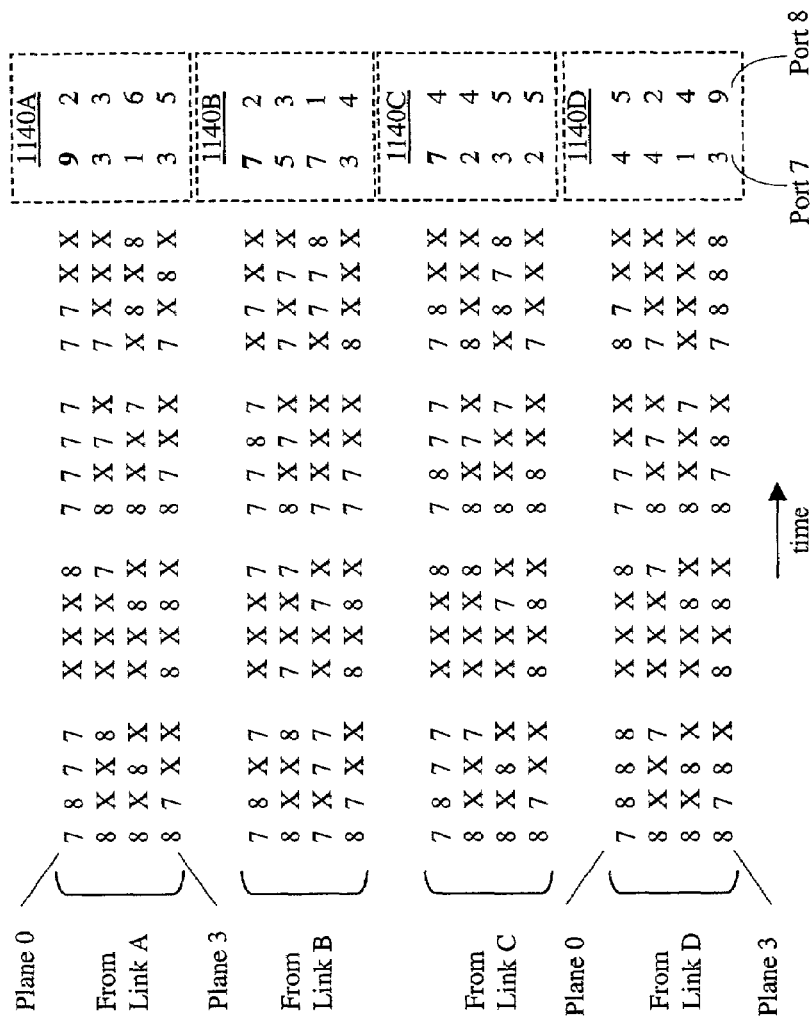
FIG. 11-a illustrates an example of load imbalance among the channels of a multi-channel link.
Figures 11B, 11C:

FIG. 11-a illustrates the load imbalance in an individual multi-channel link 248/346 at the output side of a multi-plane core node 940. The figure shows a trace of 16 consecutive data segments received at a four-plane core node 940. The planes are identified as plane-0 to plane-3. A trace is an array of 16 entries, each entry containing an identifier of an output port in a respective switching plane in a respective multi-channel link. Only two output ports, identified by port numbers 7 and 8 are observed to illustrate the imbalance problem. The trace from incoming link "A" has four arrays, one array corresponding to a single input channel 923 in link "A". The trace corresponding to plane-0 shows consecutive segments destined to output ports 7, 8, 7, 7, etc. An entry of "X" denotes a "don't care", the content being irrelevant because the focus is on output ports 7 and 8. The tally of the load from link A is 16 segments to output port 7 and, 16 segments to output port 8. In plane-0, the numbers of segments received from link "A" and destined to output ports 7 and 8 respectively are 9 and 2, expressed as {9, 2}. The corresponding figures for planes 1 to 3 are {3, 3}, {1, 6}, and {3, 5} as indicated in FIG. 11-a, reference numeral 1140A. Similarly, the load from link "B" to output ports 7 and 8 during the observation period of 16-segment duration are {7, 2}, {5, 3}, {7, 1}, and {3, 4}, as indicated in FIG. 11-a, reference numerals 1140B. Corresponding figures from link "C" and link "D" are indicated in FIG. 11-a, reference numerals 1140C, and 1140D, respectively. The summary of the number of segments from the four links "A" to "D" to be forwarded to ports 7 and 8 in each of the four planes is shown in FIG. 11-b, reference numeral 1160. The summary of the number of segments forwarded to ports 7 and 8 in each of the four planes is shown in FIG. 11-c, reference numeral 1180. It is seen that 27 segments are destined to port 7 of plane-0, exceeding the realizable limit of 16 segments. Thus, 11 segments must wait at input buffers of core node 940. Similarly, 23 segments are forwarded to port-8 of plane-3, exceeding the realizable limit of 16 segments. In the mean time, ports 7 in planes 1 to 3 receive less segments -than capacity and ports 8 in planes 0 and 1 receive less segments than capacity.

The pattern exhibited in FIG. 11-a can persist for extended periods of time leading to situations of focused overload and resulting in significant data loss or a reduced throughput of a parallel-plane core node 940 (FIG. 9 or 10), hence forcing de-loading to preserve service quality. The imbalance problem is less severe in a single-plane core node 840 (FIG. 8). However, as noted earlier, a single-plane core node 840 unduly limits the scalability of the entire network 200. The method of second-order smearing according to the present invention solves the problem of focused overload && by equalizing the load among the switching planes 950 of core node 940 for each set of output ports that connects to a multi-channel link.

Granularity

Packets of variable lengths received at an ingress port of a source node are first parsed to identify an address field and the address is translated to determine a forwarding address. In the source node according to the invention, the forwarding address is one of the M outgoing W-channel links. Internally, the data transferred from the output ports of each source node to the input ports of each sink node is structured in equal-size blocks, also called data segments. Each data segment includes a header which has, amongst other parameters, an indication of the destination sink node. A core node switches data segments. Thus, while a path from a source node to a sink node comprises entire multi-channel links, the rate allocation from any source node to any sink node can be of a very fine granularity.

Core Nodes

Figure 12:
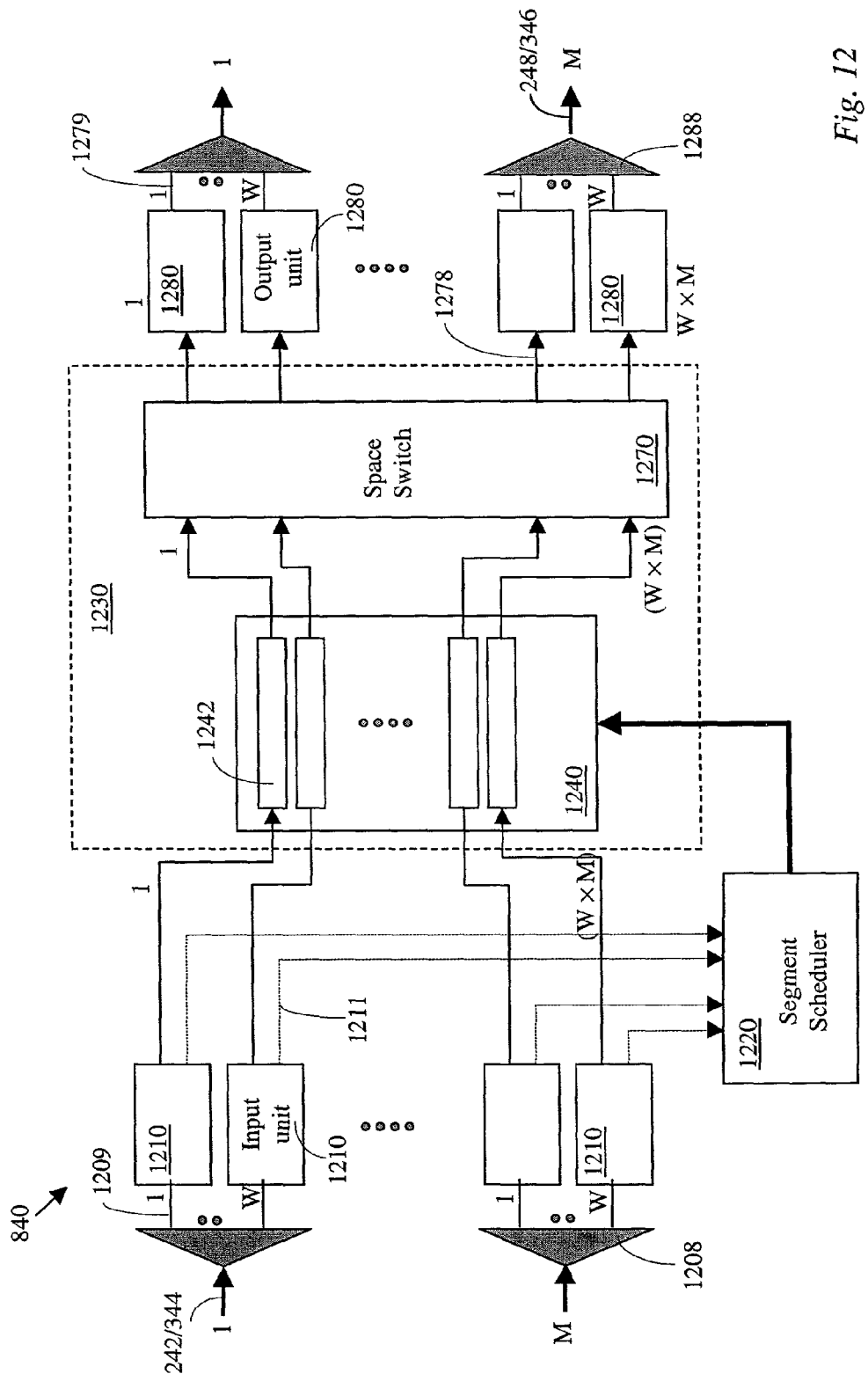
FIG. 12 shows the separation of payload data and control data at a single-plane core node.

FIG. 12 is a schematic of a rudimentary core node 240 (FIG. 2, 3, or 4), configured as a single-plane core node 840 (FIG. 8), which supports a plurality of M incoming links, labeled 1 to M, consecutively. An incoming link 242/344 may support a large number of channels (wavelength in a WDM fiber link). In FIG. 12, each incoming link 242/344 is assumed to have the same number W of channels (wavelengths) for clarity of illustration. In a typical implementation, the number of active channels may differ from one incoming multi-channel link to another. Core node 840 supports M outgoing multi-channel links. The channels of incoming link 242/344 are demultiplexed in demultiplexer 1208 to W individual channels 1209 and each channel 1209 is connected to an input unit. Incoming links 242/344 are typically WDM fiber links, demultiplexer 1208 is a WDM demultiplexer, and optical to electrical conversion takes place at input unit 1210. Input unit 1210 receives data segments from channels 1209 and extract a header from each segment, the header indicating an output port of core node 840 from which said each segment must exit.

To serve as a viable component in a high-capacity predominantly single-hop network, a core node 240 must have a significantly high capacity. By necessity, a high-capacity single-plane core node implementation 840 must use a scalable architecture such as an input-buffered space switch, well known in the art. FIG. 12 shows an input buffered switching fabric 1230 that comprises a space switch 1270 having (W×M) ports, to support M incoming links each link having W channels, with each port provided with a payload data buffer 1242. The logical collection of the (W×M) payload data buffers, referenced as 1240, are not necessarily physically collocated.

Data segment scheduler 1220 receives segment headers from input units 1210, each header indicating an output port from which the segment is to be delivered to the network core. Scheduler 1220 is autonomous, it is not driven by any rate control devices and it need not be aware of the mapping of output ports of space switch 1270 to outgoing links 248/346. The entire core node 840 is deliberately kept devoid of any intelligent processing other than direct segment scheduling and other rudimentary tasks. The main challenge in constructing a data segment scheduler 1220 is to make it scalable to support a large number of incoming channels 1209. An apparatus for scheduling a high-capacity input-buffered space switch is described in U.S. patent application, Ser. No. 09/244,824, filed on Feb. 4, 1999 and titled "Rate-Controlled Multi-class High-capacity Packet Switch", which has inventors common to those of the present invention and the contents of which are incorporated herein by reference.

The output channels 1278 from the space switch 1270 are connected to output units 1280 and the output channels 1279 of output units 1280 are grouped in groups of W channels and the W channels of each group are multiplexed in multiplexer 1288 into outgoing multi-channel links 248/346. Outgoing multi-channel links 248/346 are typically WDM fiber links and multiplexers 1288 are WDM multiplexers. Optical-electrical conversion (not illustrated) takes place at the output units 1280.

It is difficult to construct a switching fabric 1230 that supports more than a 1000 dual channels (a dual channel comprises an incoming channel and an outgoing channel leading to the same edge node). This limits the number of edge nodes in a network 200, 300, or 400. For example, with W=40 channels, the number M of incoming multi-channel links would be of the order of 25, and with a channel capacity of 10 Gb/s, the single-plane switch 840 would have a capacity of only 10 Terabits per second (Tb/s). The maximum number of core nodes 840 is limited by the number of multi-channel links connecting an edge node 120/160 to a core node 240/840 in the network 200 of FIG. 2. A practical limit of the number of links connecting an edge node to the entire network core, when core nodes 840 are deployed, is about eight, i.e., the maximum number of core nodes 840 is of the order of eight. It is noted, however, that the use of core nodes 840 simplifies the load-balancing function since only first-order smearing is required, as will be described below.

Thus, in overview, the single-plane core node configuration 840 of FIG. 8 limits the capacity of a network 200, 300, or 400 to about an order of magnitude higher than the practical capacity limit of 10 Tb/s of core node 840, yielding a network capacity of the order a 100 terabits per second. An advantage of using a single-plane core node 840 is that load-balancing under service rate control is relatively easy to implement, resulting in an efficient network that treats each link or virtual link as a single shared resource.

Figure 13:
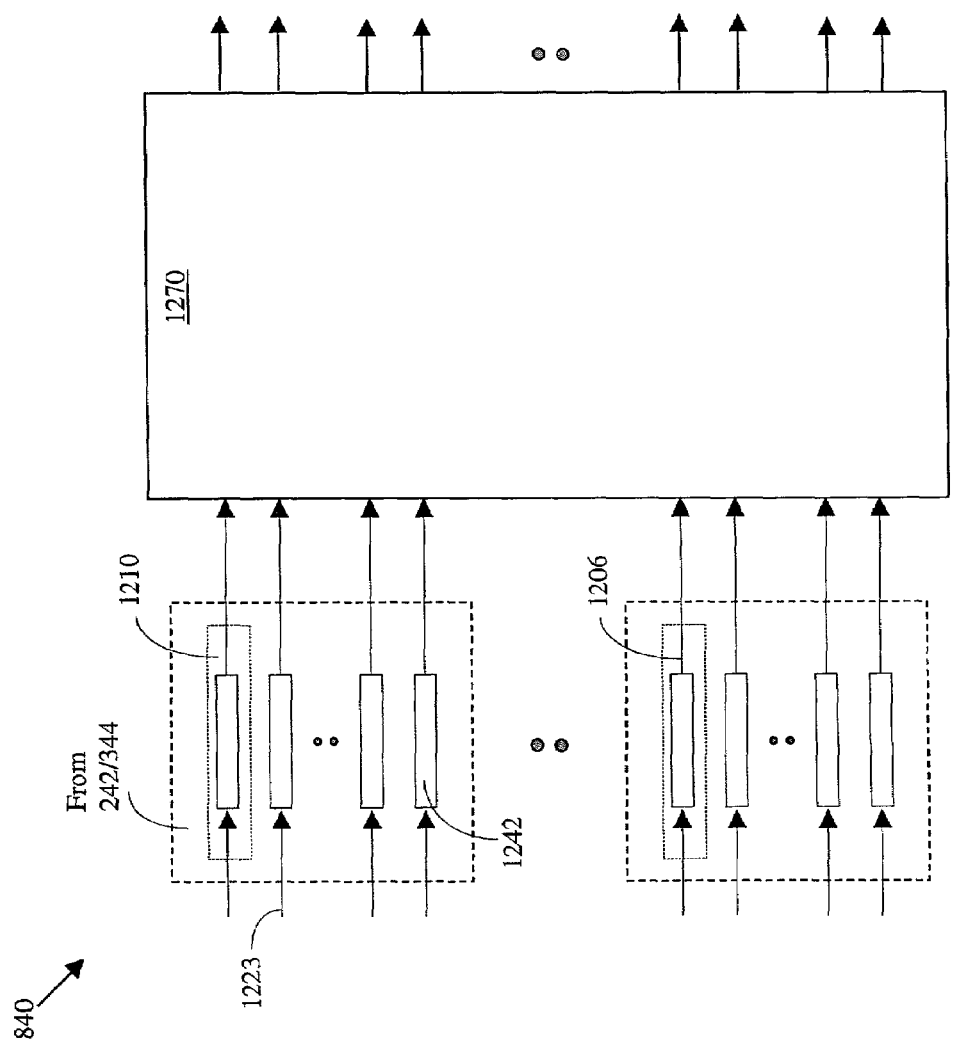
FIG. 13 is a simplified view of a single-plane core node.

FIG. 13 shows the connection of a multi-channel link 242/344 to a single-plane core node 840. As mentioned earlier, a single-plane core node 840 is suitable for a network of moderate capacity. At a core node 840, the multi-channel signal received from an incoming link 242/344 is demultiplexed into separate channels 1223. In a single-plane core node 840, each of the demultiplexed channels 1223 is connected to an input unit 1210 of the core node 840. The core node 840 has a segment scheduler 1220 as described with reference to FIG. 12. At each input unit 1210, the data segments are received, held in a buffer 1242, and the headers of the data segments are sent to the autonomous segment scheduler 1220. The function of the segment scheduler is to determine the time of transfer of each segment. Each input unit 1210 has a controller (not illustrated) which implements the segment schedule it receives from the autonomous segment scheduler 1220. Several scheduling methods can be devised and are known in the prior art.

The first-order smearing method used to balance the load among the channels of a multi-channel link serves one important purpose, which is to enable the source node to treat the multi-channel link as a single shared medium thus increasing the traffic-carrying capacity of the link. This is particularly important when the individual data streams are of relatively high bit rates. For example, if the mean bit rate per data stream is 1 Gb/s, then sharing a channel of 10 Gb/s capacity requires that the mean occupancy of the channel be limited to, typically, about 0.6 or so. If an entire link of 40 channels is used, each channel having a capacity of 10 Gb/s, then the mean link occupancy (hence, the mean channel occupancy) can be increased to over 0.95. It is also noted that one of the advantages of distributing the load equally across a link or a virtual link is that during periods of high vacancy, the network performance is significantly enhanced because the vacancy is equalized among the channels.

Figure 14:
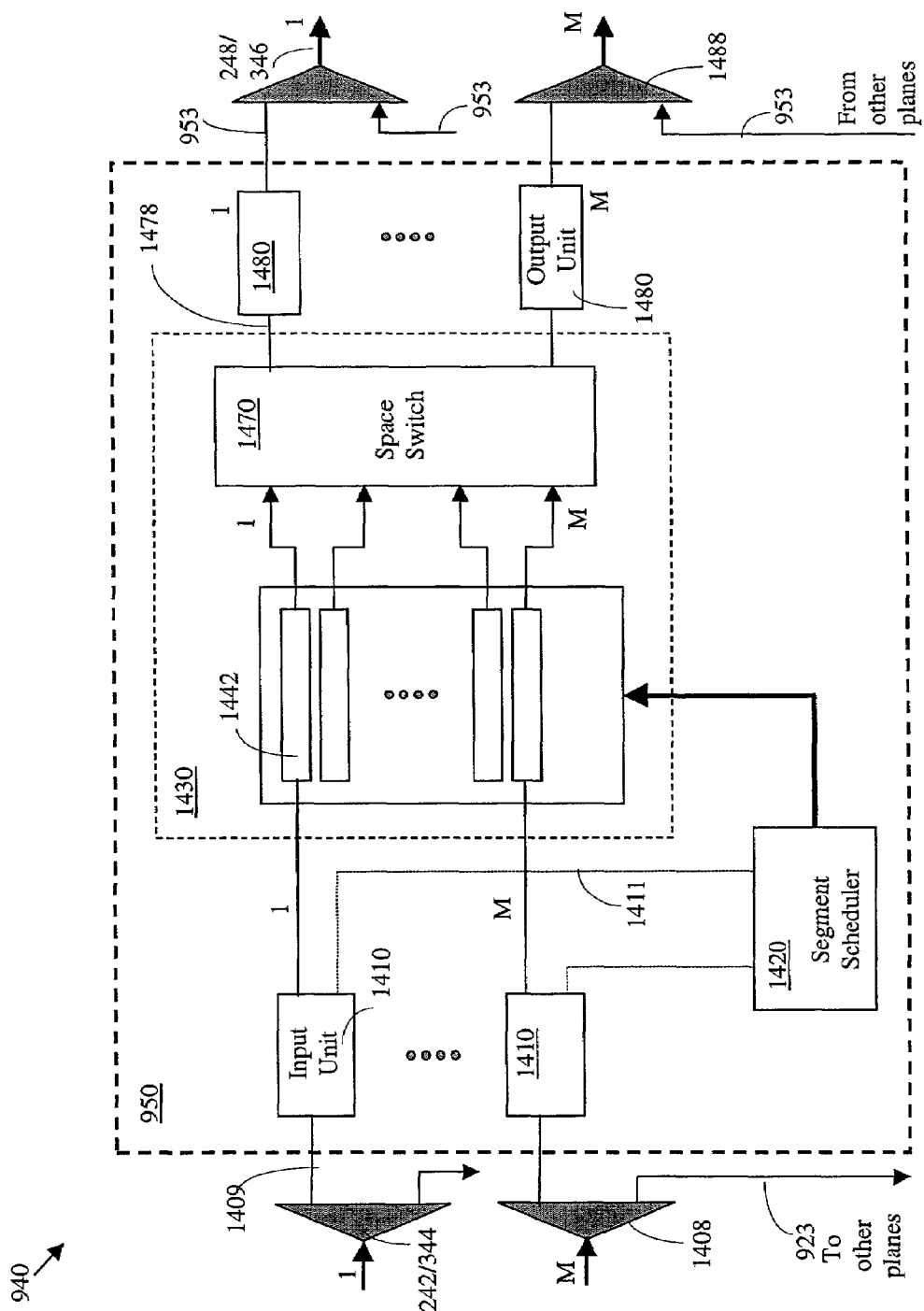
FIG. 14 shows the separation of payload data and control data at a multiple-plane core node.

FIG. 14 is a schematic of one of the switching planes 950 in a multiple-plane node 940 (FIG. 9) which supports a plurality of M incoming links, labeled 1 to M, consecutively. The switching plane shown is based on a conventional prior-art architecture and is described here only to indicate its role in the entire load-balanced multi-channel network 200, 300, or 400. It is noted that the core node 240, whether constructed as a single-plane core node 840 or a multiple-plane core node 940, does not participate in any of the intelligent segment-routing decisions, and does not need to coordinate its autonomous segment scheduling function with the intelligent segment scheduling function at any of the source nodes 120 to which said core node 240/940 is connected.

An incoming link may support a large number of channels (wavelengths in a WDM fiber link). In a multiple-plane node 940, each incoming multi-channel link must have the same number of channels (wavelength). Core node 940 supports M outgoing multiple-channel links. The switching fabric 1430 is preferably a conventional input buffered space switch having payload data segment buffers 1442, one buffer for each input port of a space switch 1470. The channels of an incoming multiple-channel link 242/344 are demultiplexed in demultiplexer 1408 and a subset 1409 of channels is connected to an input unit 1410. A subset 1409 of channels may include only a single channel (923, FIG. 9). The data segments received from a subset 1409 are parsed in input unit 1410 to separate a header that indicates a destination of a segment and, hence, an output channel in an outgoing multi-channel link 248/346. This information, in turn is used to determine an output port of space switch 1470 for each incoming data segment.

If switching fabric 1430 is constructed to serve 1000 input ports and 1000 output ports, each of said input ports or output ports transferring data at a rate of 10 Gb/s, for example, then each switching plane 950 would have a nominal capacity of 10 Tb/s. The actual traffic capacity of switching plane 950 (or switching plane 840) may be slightly lower than its nominal capacity due to scheduling imperfection as well as traffic-intensity fluctuations.

Figure 15:
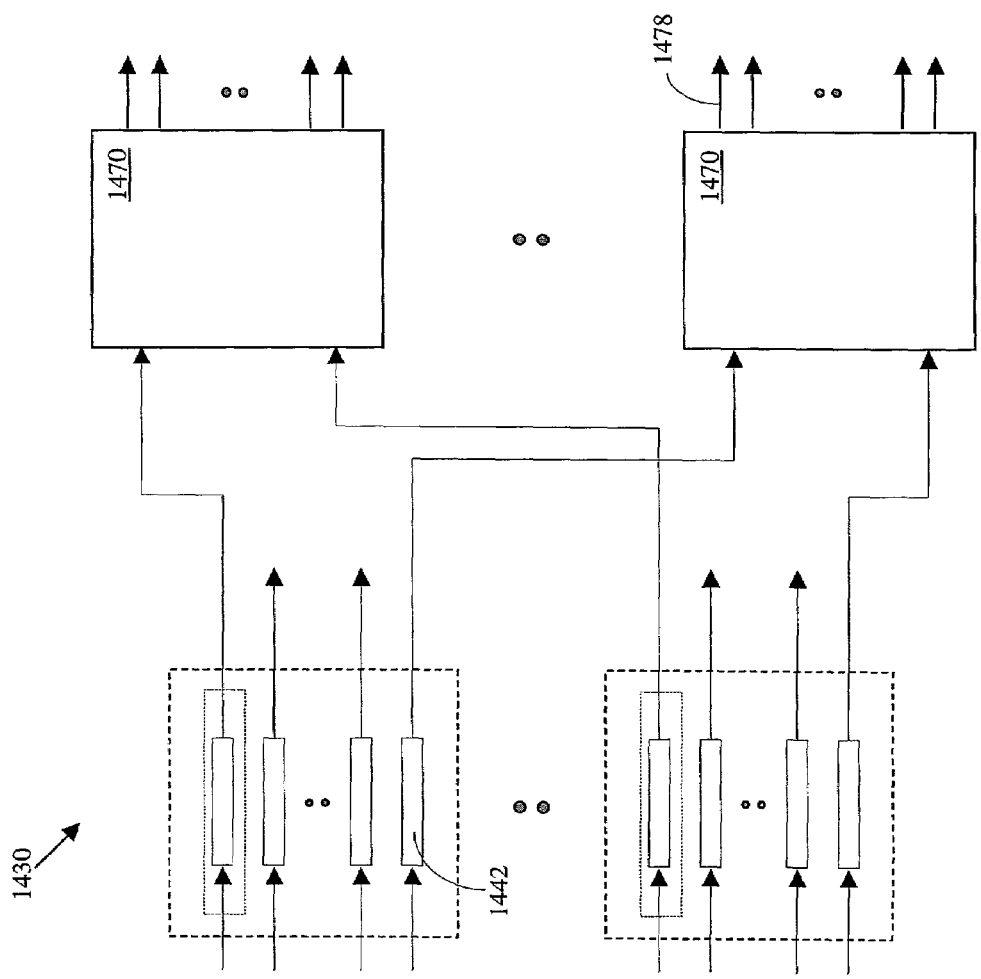
FIG. 15 is a simplified view of a multiple-plane core node.

FIG. 15 shows the connection of a multi-channel link 242/344 to a multi-plane core node 940. In a parallel-plane core node, as illustrated in FIG. 9, the multi-channel signal received from a link 242/344 is demultiplexed into individual channels 923, as illustrated in FIG. 9, and the demultiplexed channels are connected to input ports of different switching planes. The data segments received at each input port in a switching plane are placed in a respective buffer 1442 at the input port of a switching plane 950 and the headers are separated and sent to an autonomous plane segment scheduler 1420. Thus, while in FIG. 13 one autonomous segment scheduler 1220 handles the scheduling function for the entire core node, in FIG. 15, each plane has its own autonomous segment scheduler 1420. This renders the segment scheduling function manageable for high capacity core nodes.

The second order smearing method aims at balancing the load among the channels of each multi-channel link emerging from each core node. The process also leads to balancing the load among the channels of each multi-channel link emanating from each source node. Without second-order smearing, an output port in a switching plane can be become persistently overloaded while its counterpart ports in other switching planes, which connect to the same emerging multi-channel link 248/346, may be under-loaded, as illustrated in the example of FIG. 11-*a*.

In overview, in the network structures described above, the edge and the core are de-coupled with no coordination required between the edge nodes and core nodes. The core node structure of FIG. 12 illustrates the functional components of core node 840 and the core node structure of FIG. 14 illustrates the functional components of a switching plane 950 in multiple-plane core node 940. The use of a multiple-plane core node significantly enhances the scalability of a network 200, 300, or 400. The scalability is realized in both the payload-switching capacity and the required processing capacity. It is important to note that the single-plane core node structure 840 is not a special case of the multiple-plane core node structure 940 of FIG. 9.

Data-Stream Routing

As described earlier, a traffic stream is identified by a source node and a sink node, in addition to other optional descriptors. Several paths can be used from a source node to a sink node and a merit is associated with each path. The merit may be, for example, the propagation delay from a source node to a sink node, and/or vice versa, which is substantially static for a given multiple-channel WDM fiber link, with minor delay differentials for individual channels (wavelengths). In addition, each path has a time-varying vacancy indicator. To balance the load within the entire network, the path of highest vacancy should always be selected. On the other hand, to maximize merit, for example to minimize delay, the path of highest merit (minimum delay) should be selected. A compromise is to select a composite index based on both the static merit and the dynamic vacancy. By representing the merit by a 10-bit index and the vacancy by a k-bit index, $0 \leq k < 32$, for example, a composite index based on a direct addition of the two indices can be fine tuned to suit the application. For example, selecting k to be equal to 0, the highest vacancy index becomes 1 ($2^0$) and the composite index is substantially the static merit index. By selecting k to be 20, for example, the vacancy index varies between 1 and about one million ($2^{20}$). The composite index would then be mostly dominated by the vacancy index and the use of the composite index to select a core node for each data stream results in equalizing the vacancy across the network. Regardless of the value of k, a prior condition for accepting a request to accommodate a new data stream or to increase the capacity allocation for an already active data stream is that a candidate path through a core node must have a sufficient vacancy to accommodate an expected bit rate of a new data stream, or a bit rate increment of a data stream in progress.

Figure 16:
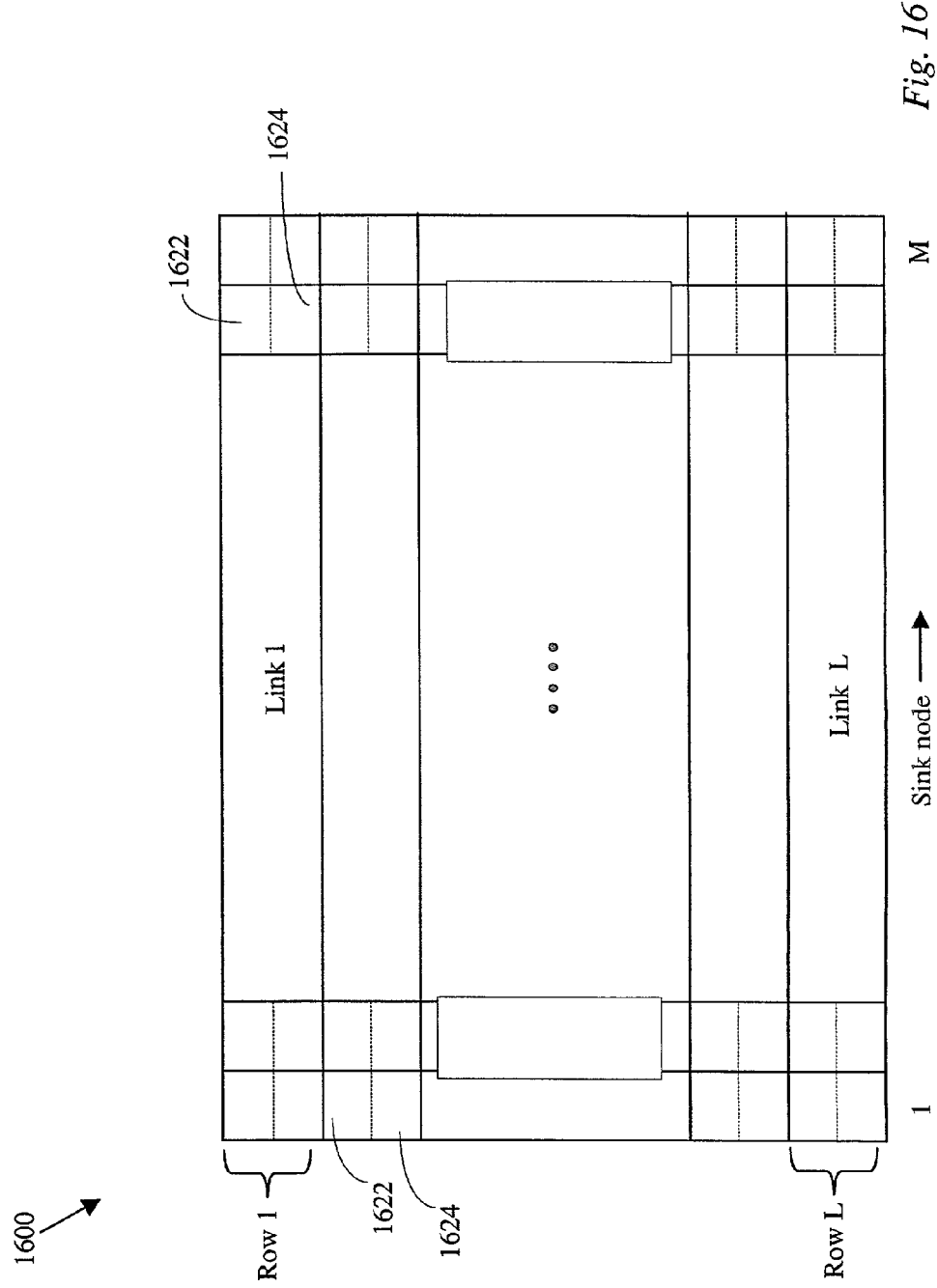
FIG. 16 shows a data structure used by a source node to facilitate the assignment of a data stream to one of the links connecting the source node to the core.

FIG. 16 shows a data structure 1600 used by a source node 120 to facilitate the assignment of a data steam to one of the links 242 (FIG. 2), 822 (FIG. 8) or 242/344 (FIG. 9), the selection of a link being based on a composite index of merit and vacancy. Structure 1600 has M columns, M being the number of sink nodes, and L rows, L being the number of links emanating from the source node 120. Each row has M records and each record has two fields 1622 and 1624. Field 1622 contains a merit index, which is preferably static. Field 1624 contains a vacancy index as described above. The vacancy index 1624 is time varying.

Table 1600 is maintained at each source node. To find a route to a specified sink node, Y, directly read the corresponding merit and vacancy quantifiers from fields 1622 and 1624 for each link in column "Y" and compute the composite index. The route of highest composite index is then selected and the corresponding vacancy field 1624 of the selected link is updated according to the bit rate allocation for the newly allocated data stream. A quality-control mechanism at a source node (not illustrated) executes the operation described above and determines for each traffic stream a preferred one of the L emanating multi-channel links.

Load Balancing Delay

The core nodes in a network 200, 300, or 400 using the multi-channel smearing method of the present invention must have input buffers to hold data segments in the event of output contention. The queueing delay at the core is expected to be higher with multiple-plane core nodes than in single-plane core nodes. However, the use of service-rate controls to ensure that a multi-channel link are appropriately loaded, in addition the balancing of data traffic load across the channels of each multi-channel link emanating from each source node, ensure that the queueing delay at the input ports of each of the multiple switching planes is negligible.

The smearing method ensures that the mean value of the traffic load directed to a specific output port of a switching plane 950 in a multiple-plane core node 940 is the same for all counterpart output ports in the other switching planes. A single-plane core node 840 is not subjected to the multiple-plane delay differential and the delay is kept low merely by virtue of the service rate control that is applied to the entire multi-channel link.

Load Balancing Apparatus

Referring to FIG. 6, which shows a schematic of a source node, load-balancing apparatus 680 collectively refer to a plurality of first-order smearing apparatus or a plurality of second-order smearing apparatus. An individual load balancing apparatus is also referenced as 680. A load balancing-apparatus is required for each virtual link connecting a source node 120 to a core node 840/940. Thus, if there are eight core nodes 840/940 in a network 200, 300, or 400, then each source node 120 requires eight load-balancing apparatus 680. The difference between a first-order and a second-order smearing apparatus will be described in connection wit FIGS. 17, 18, and 19. A load-balancing apparatus may either be implemented as a first-order smearing apparatus, if the core nodes are single-plane nodes 840 (FIG. 8), or implemented as a second-order smearing apparatus, if the core nodes are multiple-plane nodes 940 (FIG. 9). Load balancing is realized by data segment smearing across the channels of a multi-channel virtual link. A load-balancing apparatus 680 is also called a smearing apparatus and it includes memories and a smearing controller.

Figure 17:
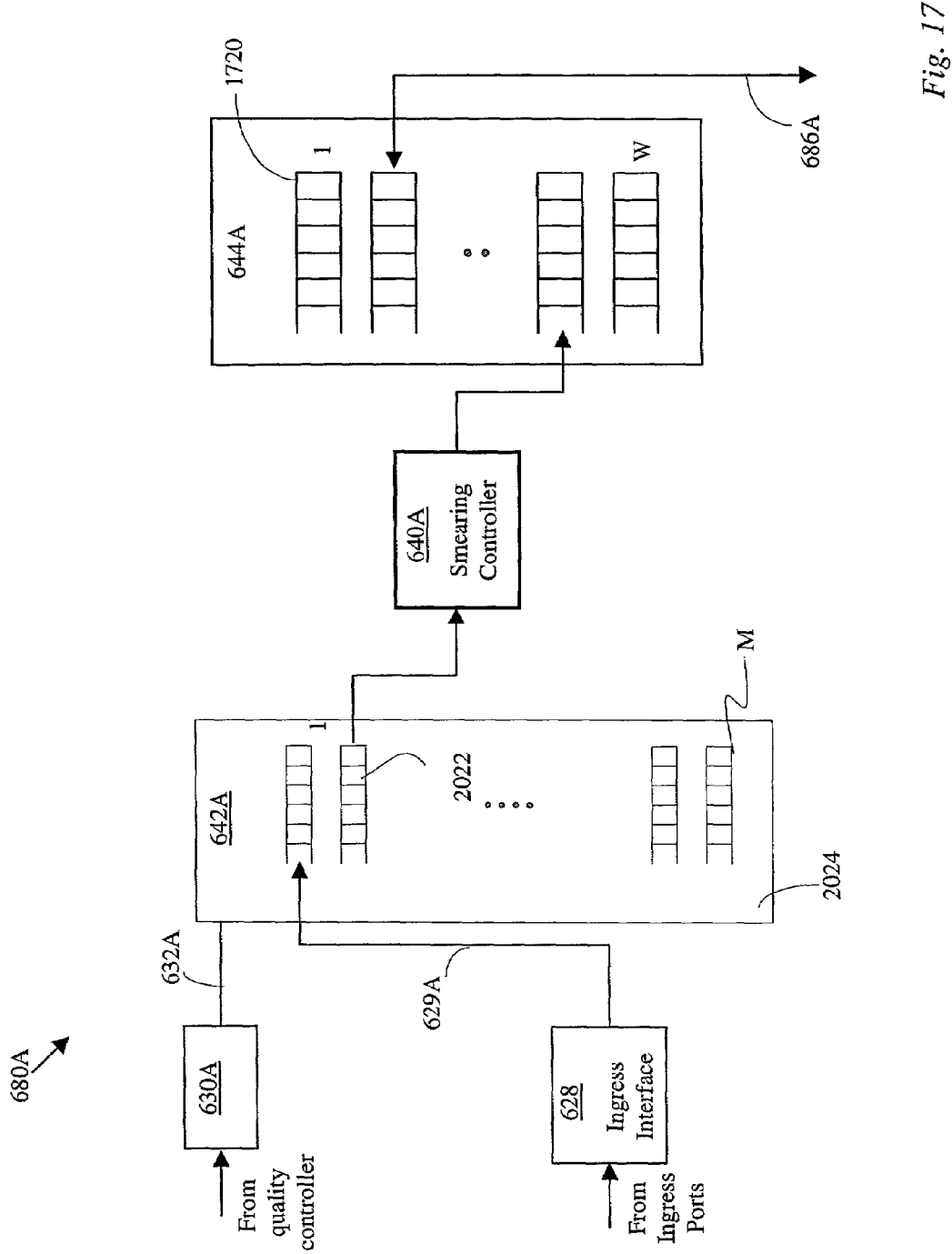
FIG. 17 details a smearing apparatus.

FIG. 17 illustrates a process of traffic balancing apparatus 680, which resides in a source node 120, and is driven by a rate controller 630 controlling the dequeueing of data segments from ingress buffers and smearing controller 640 that ensures equalized loading of the channels of each outgoing multi-channel link. A quality-control mechanism (not illustrated) determines rate allowances to each data stream and distributes them to rate controller 630.

The load-balancing apparatus 680 of FIG. 17 comprises a memory for buffering indices of data segments stored in payload memory 620 shown in FIG. 6. The indices are sorted according to sink nodes (there are M sink nodes in a network 200, 300, or 400). A service rate-regulator (also called transfer rate controller) 630 which, under control of a quality controller (not illustrated) de-queues the segments from the segment memory and presents the de-queued segments to a smearing controller 640 which can be a first-order or a second-order smearing circuit. One service-rate regulator is dedicated to each multi-channel virtual link emanating from the source node.

The function of a smearing controller 640 is to select a channel in a multi-channel virtual link. Once the smearing controller 640 has determined the channel, it places the segment in a queue 1720 associated with the selected channel of the virtual link served by said load-balancing controller. Smearing controller 640 reads the appropriate entry in array 1800, if first-order smearing is used, or in table 1900, if second-order smearing is used, to determine the identifier of queue 1720, as will be described below. Controller 640 then adds one to the read channel identifier, module W, and writes the result back onto said appropriate entry. Note that W refers to the number of channels in either a link or a virtual link.

First-order Smearing

Figure 18:
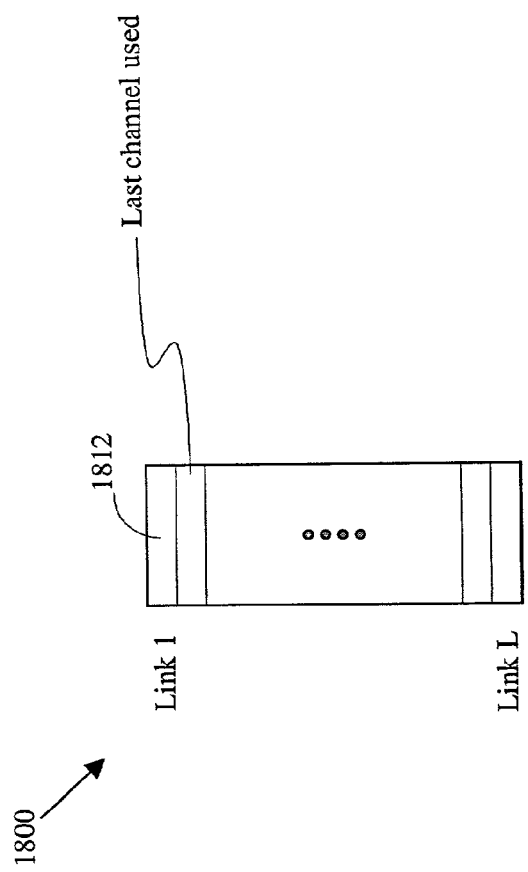
FIG. 18 shows an array storing a last-used channel in each multi-channel link to enable first-order smearing.

FIG. 18 shows an array 1800 used by each smearing controller 640 (FIG. 6) to enable the selection of a multi-channel link to carry traffic from a source node to a core node, according to a first-order smearing process. In a first-order smearing process, data segments are distributed among the channels of a multi-channel link in a round-robin fashion regardless of the data streams to which the data segments belong. Thus, consecutive data segments sharing a first multi-channel link in a multi-channel path are cyclically assigned to consecutive channels in the multi-channel link. An entry 1812 in array 1800 indicates an identifier of a last-used channel number in each of L virtual links 242/342 (FIGS. 2 and 3) connecting a source node to core nodes 240/840. A data stream is confined to a virtual link. A virtual link preferably has a sufficient number of channels to enable accommodating a data stream of a high bit rate. The channels of a virtual links are preferably numbered sequentially. To forward a data segment of a data stream assigned to a virtual link 242/342, the source node 120 supporting said link 242/342 reads a selected channel number in an entry 1812 in array 1800 corresponding to the assigned virtual link 242/342, and the data segment is then forwarded to the selected channel identifier. The channel number is then updated to point to the next channel in said virtual link. If the channels are numbered sequentially in a W-channel virtual link, then the number of said next channel is obtained by adding 1, modulo W, to the number referring to said selected channel. The updated channel number is then inserted in array 1800 at a location 1812 corresponding to the virtual link 242/342 just considered.

Second-order Smearing

Second-order smearing requires that the consecutive data segments of each individual data stream be distributed equitably among the channels of the multi-channel links. This requires that a record be kept of an eligible channel for each data stream individually.

Figure 19:
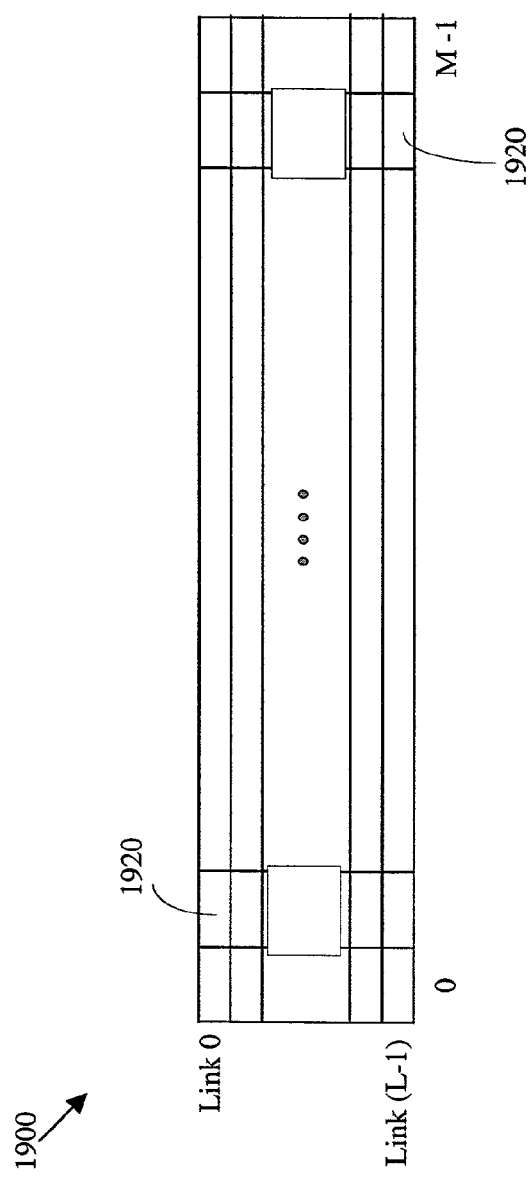
FIG. 19 shows a control table that indicates a last-used channel in a multi-channel link for each traffic stream to enable second-order smearing.

FIG. 19 shows a table 1900 used by each smearing controller 640 to enable the selection of a multi-channel link to carry traffic from a source node to a core node, according to a second-order smearing process. In a second-order smearing process, data segments of each data stream are distributed among the channels of a multi-channel link in a round-robin fashion. This differs from a first-order smearing process where data segments are distributed among the channels of a multi-channel link in a round-robin fashion regardless of the data streams to which the data segments belong. Thus, in a second-order smearing process, consecutive data segments of a data stream are cyclically assigned to consecutive channels in the multi-channel link. This requires that a channel tracking means per data stream per virtual link be provided, while in a first-order smearing process, channel tracking is required only per virtual link and data segments of all data streams assigned to a virtual link are forwarded cyclically to a channel of the virtual link. Referring to table 1900, FIG. 19, entry 1920 indicates an identifier of a last-used channel number in each of L virtual links 242/342 (FIGS. 2 and 3) connecting a source node to core nodes 240/940. A data stream is confined to a virtual link and the channels of a virtual links are preferably numbered sequentially. To forward a data segment of a data stream assigned to a virtual link 242/342, the source node 120 supporting said link 242/342 reads a selected channel number in an entry 1920 corresponding to a data stream identifier in array 1900 corresponding to the assigned virtual link 242/342 , and the data segment is then forwarded to the selected channel identifier. The channel number is then updated to point to the next channel in said virtual link in the same manner as described with respect to first-order smearing. FIG. 19 shows a number of data streams equal to the number, M, of sink nodes. The number of data streams can exceed the number of sink nodes, M, if other attributes, such as service type, are used. It is preferable, however, for data routing purposes, to limit the definition of a data stream to include only a source node, a sink node, and an assigned path. Distinction according to service type and other attributes can be exercised at the source nodes, sink nodes, or both.

If all the data traffic from a source node to a sink node can be allocated to only one of the L multi-channel links, as would usually be the case given the high capacity of a multi-channel path, then only one entry in a column in table 1900, the column corresponding to the sink node, will have a channel number. Each of the remaining entries in the column may then contain a null entry.

If the data traffic from a source node to a sink node must be routed through more than one multi-channel path, then said data traffic may be split into a plurality of data streams, each data stream being defined by its source node and sink node in addition to a selected multi-channel link 242/342. Thus, if the number of core nodes 240/840/940 in a network 200/300/400 (FIGS. 2, 3, and 4) is eight, then up to eight data streams can be assigned to the data traffic from a source node to a specific sink node, and table 1900 may be used to track the channel to be used for forwarding the data segments of each stream. However, if the number of core nodes 240/840/940 is large, 32 for example, with a large number of sink nodes, 1000 for example, then it may be preferable to use an array (not illustrated) maintained in a memory (not shown) in a source node: 120 that maps a traffic stream number onto a sink node number and an M-entry array, may be used for tracking a last-used or next-to-use channel for each data stream in each of the emanating multi-channel links (virtual links) 242/342.

The contents of FIG. 19 are updated under control of the traffic-balancing smearing controller 640 as described above with reference to FIG. 17.

Packet Assembly at Sink Node

The segments of a data stream transferred with the load-balancing method of the present invention may experience a small differential delay due to potential queueing delay at core nodes 840/940. Therefore, the segments of each data stream may be consecutively labeled at their source node so that the segments can be placed in proper order at the sink node. At the sink nodes 160, out-of-order data segments can be rearranged according to methods well known in the art. It is noted, however, that with high-capacity multi-channel link, the queue occupancy at the input buffers of core nodes 840/940 would be quite small and the delay caused by data segment rearrangement at the sink nodes is expected to be negligible.

The embodiments of the invention described above are intended to be exemplary only. Other modifications will be apparent to those skilled in the art, and the invention is, therefore, defined in the claims.

We claim:

1. A source node having a plurality of multi-channel links connecting to core nodes in a network, each of said multi-channel links comprising a respective plurality of channels, said source node operable to:

determine, for each multi-channel link in said plurality of multi-channel links:
a first merit index based on a known propagation delay along said each multi-channel link, said first merit index having a first upper bound corresponding to a lowest propagation delay;
a second merit index determined based on a current vacancy of said each multi-channel link, said second merit index having a second upper bound corresponding to full vacancy in said multi-channel link; and
a composite merit index determined as a sum of said first merit index and said second merit index;

retain, in a control table, an identifier of a last-used channel in each of said multi-channel links for each data stream from among a plurality of data steams originating from said source node;

receive a data unit belonging to a particular data stream from among said data streams;

select a particular multi-channel link from among said plurality of multi-channel links according to a desired distribution of data streams over the plurality of multi-channel links and according to said composite merit index of said each multi-channel link;

ascertain, using said control table, a particular last-used channel by said particular data stream in said particular multi-channel link; and transmit said data unit over a particular channel in said particular multi-channel link, said particular channel bearing a logical relationship to said particular last-used channel.

2. The source node of claim 1 wherein said logical relationship is an adjacency relationship determined according to a round-robin selection process of channels of said particular multi-channel link.

* * * * *